US012663084B2

(12) United States Patent
Funato et al.

(10) Patent No.: US 12,663,084 B2
(45) Date of Patent: Jun. 23, 2026

(54) SEALING MEMBER, SEALING MECHANISM, VALVE, AND SEALING METHOD

(71) Applicant: KITZ CORPORATION, Tokyo (JP)

(72) Inventors: Masazumi Funato, Chiba (JP); Tetsuya Watanabe, Chiba (JP); Mitsuru Hosokawa, Chiba (JP)

(73) Assignee: KITZ CORPORATION, Tokyo (JP)

( * ) Notice: Subject to any disclaimer, the term of this patent is extended or adjusted under 35 U.S.C. 154(b) by 0 days.

(21) Appl. No.: 18/269,843

(22) PCT Filed: Dec. 28, 2021

(86) PCT No.: PCT/JP2021/048918
§ 371 (c)(1),
(2) Date: Jun. 27, 2023

(87) PCT Pub. No.: WO2022/145467
PCT Pub. Date: Jul. 7, 2022

(65) Prior Publication Data
US 2024/0060566 A1     Feb. 22, 2024

(30) Foreign Application Priority Data

Dec. 28, 2020     (JP) ................................. 2020-219489

(51) Int. Cl.
*F16K 1/226* (2006.01)
*F16K 1/42* (2006.01)
*F16K 5/06* (2006.01)
(52) U.S. Cl.
CPC .............. *F16K 1/2263* (2013.01); *F16K 1/42* (2013.01)

(58) Field of Classification Search
CPC ............................ F16K 1/2263; F16K 5/0673
(Continued)

(56) References Cited

U.S. PATENT DOCUMENTS 3,414,233 A     12/1968   Priese
3,915,462 A     10/1975   Bruns et al.
(Continued)

FOREIGN PATENT DOCUMENTS

CH            277426 A        8/1951
CN         102777624 A       11/2012
(Continued)

OTHER PUBLICATIONS

Office Action for U.S. Appl. No. 18/269,845, dated Sep. 16, 2024, 12 pages, available in Patent Center.
(Continued)

*Primary Examiner* — Paul J Gray
(74) *Attorney, Agent, or Firm* — Casimir Jones, S.C.; Thomas J. Lyneis

(57)                ABSTRACT

Realized is a sealing member which exhibits excellent sealing properties even at a low temperature and a high pressure. A sealing member (100) includes: a first pressing part (110) that presses a first side part of a gap by pressing from a lateral direction; a second pressing part (120) that is pressed against a second side part of the gap by the pressing from the lateral direction; and a part (122) that induces deformation of the sealing member (100) such that the sealing member (100) is strained toward the second side part by the pressing from the lateral direction.

14 Claims, 12 Drawing Sheets

(58) Field of Classification Search
USPC ................................ 251/170, 173, 314, 317
See application file for complete search history.

(56) References Cited

U.S. PATENT DOCUMENTS

| | | | |
|---|---|---|---|
| 4,054,262 | A | 10/1977 | Laignel et al. |
| 5,135,019 | A | 8/1992 | Dupont |
| 7,887,024 | B2 | 2/2011 | Timko et al. |
| 2014/0084198 | A1 | 3/2014 | Ikeda |
| 2014/0110936 | A1 | 4/2014 | Shinohara |
| 2016/0061284 | A1 | 3/2016 | Yamashita |
| 2017/0299065 | A1 | 10/2017 | Miyashita et al. |
| 2017/0321814 | A1 | 11/2017 | Aoki et al. |
| 2019/0154161 | A1 | 5/2019 | Kazama et al. |
| 2020/0124190 | A1* | 4/2020 | Kawamoto ........... F16K 5/0673 |

FOREIGN PATENT DOCUMENTS

| | | |
|---|---|---|
| CN | 105387117 A | 3/2016 |
| CN | 205978579 U | 2/2017 |
| CN | 111306317 A | 6/2020 |
| GB | 1459520 A | 12/1976 |
| JP | 48-29236 | 9/1973 |
| JP | 59-194665 | 12/1984 |
| JP | 05-42846 | 6/1993 |
| JP | 2001-280517 | 10/2001 |
| JP | 2003-83457 | 3/2003 |
| JP | 2012-2355 | 1/2012 |
| JP | 2018-054070 | 4/2018 |
| JP | 2019-65984 | 4/2019 |
| WO | WO 2016/056535 | 4/2016 |
| WO | 2016/093271 | 6/2016 |
| WO | WO 2016/182066 | 11/2016 |

OTHER PUBLICATIONS

International Search Report for PCT/JP2021/048902 and its English translation. Mailed Feb. 1, 2022. 4 pages.

Written Opinion for PCT/JP2021/048902 and its English Translation. Report completed Mar. 30, 2022. 7 pages.

Written Opinion for PCT/JP2021/048918 and its English Translation. Mar. 22, 2022. 6 pages.

International Search Report for PCT/JP2021/048918 and its English translation. Mailed Mar. 22, 2022. 4 pages.

European Search Report for EP Patent Application No. 21915321.0, dated Oct. 1, 2024, 7 pages.

European Search Report for EP Patent Application No. 21915325.1, dated Oct. 2, 2024, 7 pages.

Office Action for JP Patent Application No. 2022-573112, dated Oct. 7, 2025, 3 pages.

Office Action for EP Patent Application No. 21915321.0, dated May 15, 2025, 6 pages.

Office Action for CN Patent Application No. 202180087313.3, dated Nov. 20, 2025, 8 pages.

Office Action For CN Patent Application No. 202180087309.7, dated Jan. 22, 2026, 8 pages.

* cited by examiner

SEALING MEMBER, SEALING MECHANISM, VALVE, AND SEALING METHOD

STATEMENT OF RELATED APPLICATIONS

This application is a national phase application under 35 U.S.C. § 371 of PCT International Application No.: PCT/JP2021/048918, filed on Dec. 28, 2021, which claims the benefit of JP Patent Application No. 2020-219489, filed Dec. 28, 2020, the contents of each of which are incorporated by reference herein.

TECHNICAL FIELD

The present invention relates to a sealing member, a sealing mechanism, a valve, and a sealing method.

BACKGROUND ART

Conventionally, trunnion-type ball valves have been known as valves used in high-pressure environments or high-temperature environments. FIG. 15 illustrates a cross section of a main part of an example conventional trunnion-type valve. As illustrated in FIG. 15, the valve includes: a ball seat 82 for pressing, from a lateral direction, a ball valve element disposed in a body 510; a retainer gland 63 that is biased to a ball valve element side by a spring 84; and a packing 500 for sealing a gap between the body 510 and the ball seat 82. Note that a shape of the packing 500 in a plan view (hereinafter, also referred to as simply "planar shape") is typically an endless shape such as an annular shape.

In a cross-sectional shape of the packing 500, the packing 500 has a straight inner circumferential wall surface 501 and a straight outer circumferential wall surface 502 that are parallel to each other, and has a first end surface and a second end surface that each include a tapered surface(s). The first end surface includes: on an inner circumferential wall surface 501 side, a first tapered surface 503 that is configured such that a distance from the first tapered surface 503 to the inner circumferential wall surface 501 gradually reduces toward a first end side; and on an outer circumferential wall surface 502 side, a first reverse tapered surface 504 that is configured such that a distance from the first reverse tapered surface 504 to the outer circumferential wall surface 502 gradually reduces toward the first end side. The second end surface includes a second tapered surface 505 that is configured such that a distance from the second tapered surface 505 to the outer circumferential wall surface 502 gradually reduces toward a second end side (see, for example, Patent Literature 1).

CITATION LIST

Patent Literature

[Patent Literature 1]
International Publication No. WO 2016/182066

SUMMARY OF INVENTION

Technical Problem

The sealing member can exhibit excellent sealing properties in a high-temperature or high-pressure environment. In recent years, there has been a growing demand for, for example, valves for controlling ultra-low temperature fluids such as liquefied petroleum gas (LPG) and liquefied hydrogen. Under the circumstances, sealing members that can exhibit sufficient sealing properties even in low-temperature (particularly ultra-low-temperature) environments so as to be applicable to, for example, such valves that are used at ultra-low temperatures have been required.

The object of an aspect of the present invention is to realize a sealing member that exhibits excellent sealing properties even in a low-temperature environment.

Solution to Problem

In order to attain the above object, a sealing member in accordance with an aspect of the present invention is a sealing member which seals a gap, of which a first end is an opening and a second end is a contact part and in which a direction from the first end to the second end is a depth direction, by coming into close contact with both side parts and the contact part of the gap in a case where the sealing member is disposed in the gap and pressed in the depth direction from a first end side, the sealing member including: a first pressing part that, at a first end side of the sealing member, presses and comes into close contact with a first side part of the gap in a case where the sealing member is pressed in the depth direction from the first end side in the gap; a second pressing part that, at a second end side of the sealing member, comes into close contact with the contact part and presses and comes into close contact with a second side part of the gap in the case where the sealing member is pressed in the depth direction from the first end side in the gap; and a deformation inducing part that strains the sealing member in a direction in which the second pressing part is directed to the second side part of the gap, in the case where the sealing member is pressed in the depth direction from the first end side in the gap.

In order to attain the above object, a sealing mechanism in accordance with an aspect of the present invention is sealing mechanism which is configured such that a sealing member is disposed in a gap, of which a first end is an opening and a second end is a contact part and in which a direction from the first end to the second end is a depth direction, so as to seal the gap by coming into close contact with both side parts and the contact part of the gap in a case where the sealing member is pressed in the depth direction from a first end side, wherein: the sealing member includes a first pressing part that is disposed on a first end side of the sealing member and that presses a first side part of the gap in a case where the sealing member is pressed in the depth direction of the gap in a state of sealing with the sealing member, a second pressing part that is disposed on a second end side of the sealing member and that comes into close contact with the contact part and presses a second side part of the gap by pressing with respect to the first pressing part in the state of sealing with the sealing member, and a deformation inducing part that strains the sealing member in a direction in which the second pressing part is directed to the second side part of the gap, by the pressing with respect to the first pressing part in the state of sealing with the sealing member; the first pressing part is apart from the second side part of the gap, and the second pressing part is apart from the first side part of the gap; and the sealing member seals the gap in a state where the second pressing part is strained toward the second side part of the gap, by being pressed in the depth direction from the first end side so that the first pressing part moves to the second end side and the second pressing part comes into contact with the contact part.

In order to attain the above object, a valve in accordance with an aspect of the present invention is a valve including: a body; a seat member; a retainer gland; and the above sealing member, the body and the seat member forming a gap of which a first end is an opening and a second end is a contact part and in which a direction from the first end to the second end is a depth direction, the sealing member sealing the gap by being inserted into the gap and pressed toward the seat member by the retainer gland.

In order to attain the above object, a sealing method in accordance with an aspect of the present invention is a sealing method for sealing a gap between a seat member and a body of a valve by disposing the above sealing member in the gap and pressing the first pressing part of the sealing member toward the seat member with use of a retainer gland.

Advantageous Effects of Invention

According to an aspect of the present invention, it is possible to realize a sealing member that exhibits excellent sealing properties even in a low-temperature environment.

DESCRIPTION OF EMBODIMENTS

[Configuration of Sealing Member]

A sealing member in accordance with an embodiment of the present invention is for filling a gap having a bottom. The sealing member is disposed such that a first end part thereof is located on an opening side of the gap and a second end part thereof is in contact with the bottom of the gap. A first end of the gap is an opening, and a second end of the gap is a contact part. A direction from the first end toward the second end is defined as a depth direction.

Figure 1:
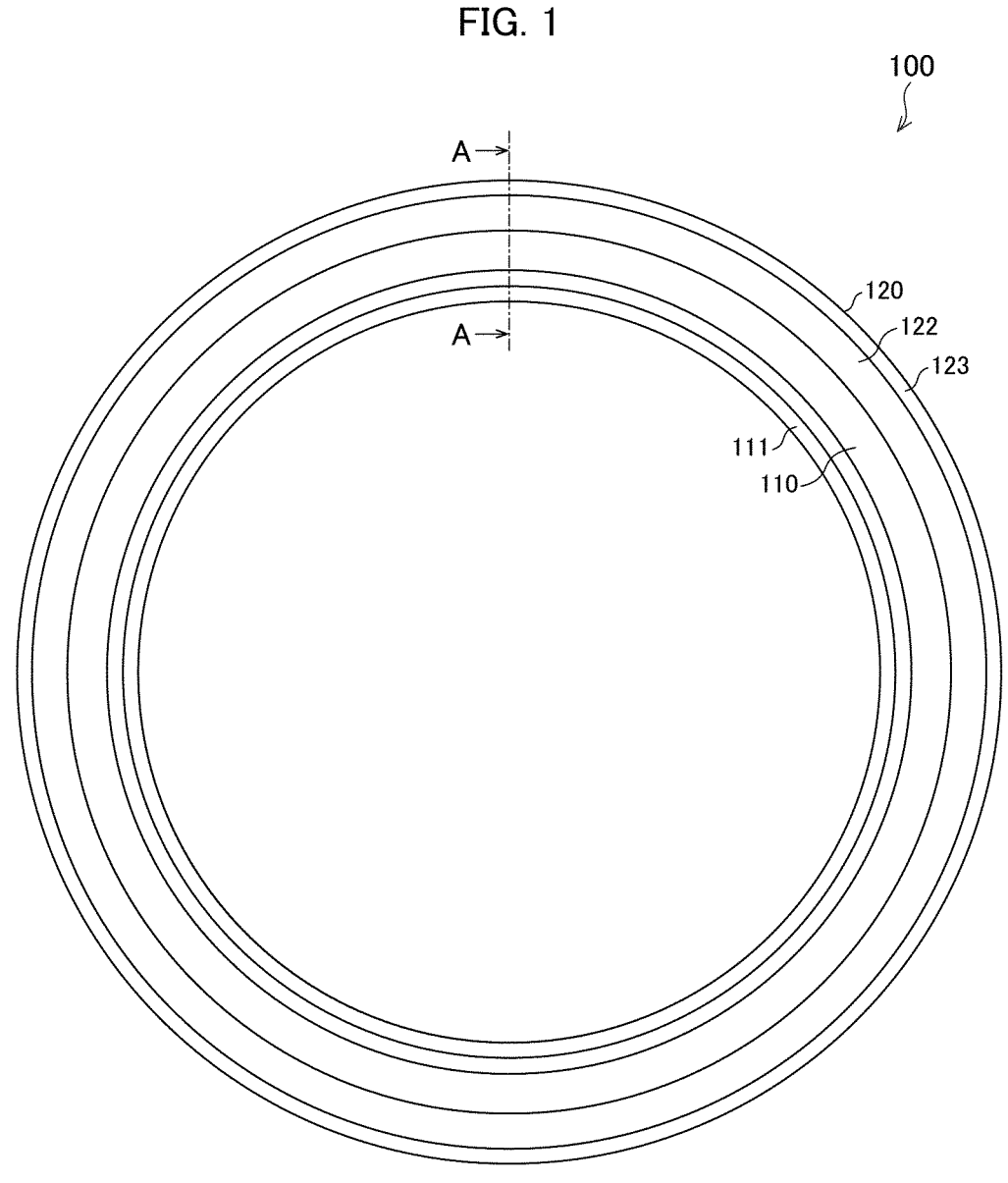
FIG. 1 schematically illustrates a sealing member in accordance with an embodiment of the present invention.
Figure 2:
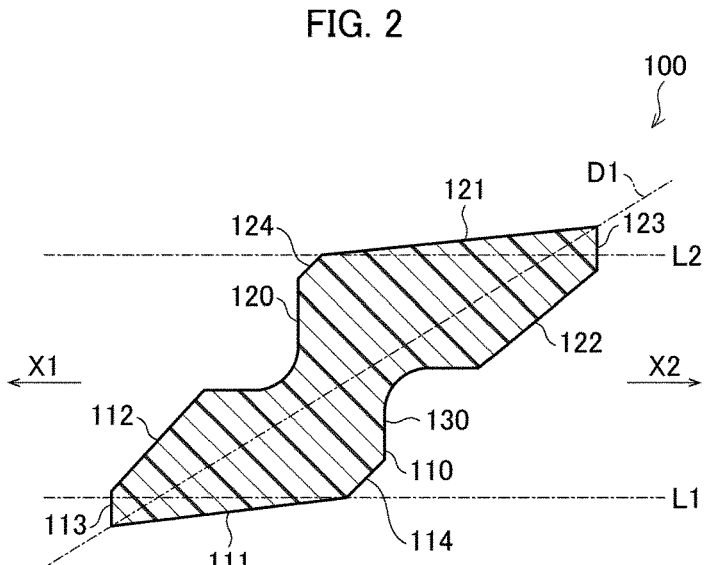
FIG. 2 is a cross-sectional view illustrating the sealing member taken along a line A-A illustrated in FIG. 1.

FIG. 1 schematically illustrates a sealing member in accordance with Embodiment 1 of the present invention. FIG. 2 is a cross-sectional view illustrating the sealing member illustrated in FIG. 1 and taken along a line A-A. A shape of the sealing member in accordance with the present embodiment in a plan view (a planar shape of the sealing member) is an annular shape as illustrated in FIG. 1. Substantially along an axial direction of the annular shape, the sealing member 100 is inserted into a gap that should be sealed. Thus, the sealing member 100 has a planar endless shape.

A material of the sealing member 100 can be determined as appropriate, provided that the sealing member 100 exhibits desired sealing properties. Further, the material of the sealing member 100 can be selected, as appropriate, in accordance with various conditions, such as mechanical strength, thermal stability, and deformability, that are typically required for the sealing member 100. The material of the sealing member 100 may be inorganic or may be alternatively organic. The material of the sealing member 100 may be constituted by one kind of material or may be alternatively constituted by two or more kinds of materials. Examples of the material of the sealing member 100 include inorganic materials and organic materials. Examples of the inorganic materials include graphite. Examples of the organic materials include resins, and more detailed examples of the organic materials include ultra-high molecular weight polyester (UMW-PE). In a case where the sealing member 100 is used under a low-temperature condition, the sealing member 100 is preferably made of a resin.

The sealing member 100 is integrally formed from a resin. The sealing member 100 includes a first pressing part 110, a second pressing part 120, and a connection part 130, as illustrated in FIG. 2. A cross-sectional shape of the sealing member 100 is a substantially inverted Z shape in a cross section in a direction illustrated in FIG. 2.

Note that the axial direction of the planar shape of the sealing member 100 is also referred to as "X direction", and one X direction is also referred to as "X1 direction" and the other X direction is also referred to as "X2 direction". Note also that an X1 direction side of the sealing member 100 is also referred to as "first end side", and an X2 direction side of the sealing member 100 is also referred to as "second end side". Note also that, in a direction perpendicular to the axial direction of the sealing member 100, a first pressing part 110 side is also referred to as "first side", and a second pressing part 120 side is also referred to as "second side".

The first pressing part 110 is a part close to a first end of the sealing member 100 and the first side of the sealing member 100. The first pressing part 110 includes a first side surface 111, a first tapered surface 112, and a first cutout end part 113. The second pressing part 120 is a part close to a second end of the sealing member 100 and the second side of the sealing member 100. The second pressing part 120 includes a second side surface 121, a second tapered surface 122, and a second cutout end part 123.

Note that a first imaginary straight line L1 and a second imaginary straight line L2 are set in the sealing member 100. The first imaginary straight line L1 is a straight line that connects a second end edge of the first side surface 111 and a first end edge of the first tapered surface 112 in the cross-sectional shape of the sealing member 100. The second imaginary straight line L2 is a straight line that connects a first end edge of the second side surface 121 and a second end edge of the second tapered surface 122 in the cross-sectional shape of the sealing member 100. The first imaginary straight line L1 and the second imaginary straight line L2 are parallel to each other, and a distance between these straight lines is substantially the same as a width direction of the gap. In the present embodiment, in a cross-sectional shape of the gap, which should be sealed with the sealing member 100, in a valve, the first imaginary straight line L1 substantially overlaps a first side part (inner circumferential surface) of the gap, and the second imaginary straight line L2 substantially overlaps a second side part (outer circumferential surface) of the gap.

The sealing member 100 further includes a first beveled part 114 and a second beveled part 124. In the cross-sectional shape of the sealing member 100, the first beveled part 114 is formed on the second end edge of the first side surface 111, and has a shape obtained by cutting off, obliquely in a straight line, a corner at which a line extending from the first side surface 111 and a line extending from a second end edge of the connection part 130 intersect with each other. In the cross-sectional shape of the sealing member 100, the second beveled part 124 is formed on the first end edge of the second side surface 121, and has a shape obtained by cutting off, obliquely in a straight line, a corner at which a line extending from the second side surface 121 and a line extending from a first end edge of the connection part 130 intersect with each other.

In the cross section of the sealing member 100, a straight line that connects a point of intersection of the first side surface 111 and the first cutout end part 113 and a point of intersection of the second side surface 121 and the second cutout end part 123 is defined as a rotation axis D1 of the sealing member 100. The first beveled part 114 and the second beveled part 124 substantially overlap one another in a case where the cross section of the sealing member 100 is rotated 180 degrees about the rotation axis D1.

The first beveled part 114 is larger than the second beveled part 124. That is, the first beveled part 114 has a shape obtained by cutting off, to a large extent, the corner formed by the above-described extending lines, as compared with the second beveled part 124.

[Configuration of First Pressing Part]

The first side surface 111 is a first side surface of the first pressing part 110, and is a part of an inner circumferential surface of the sealing member 100 having a toric shape. The first side surface 111 is a surface that comes into contact with the first side part of the gap in a state of sealing with the sealing member 100. The first side surface 111 is a tapered surface that is configured such that, with reference to the first imaginary straight line L1 and the second imaginary straight line L2, a distance between the tapered surface and the second imaginary straight line L2 gradually reduces toward the second end edge of the first side surface 111.

An angle of an acute angle formed by the first side surface 111 and the second imaginary straight line L2 can be determined as appropriate from a range of 0.5 degrees to 5 degrees, from the viewpoint of increasing a force exerted by the first pressing part 110 so as to press the first side part of the gap (described later) and from the viewpoint of increasing distribution of the force in the X direction.

The first tapered surface 112 is a surface that is exposed at a first end side of the first pressing part 110. The first tapered surface 112 is an inclined surface that is configured such that, in the cross-sectional shape of the sealing member 100, a distance from the first side surface 111 to the inclined surface gradually reduces toward the first end of the sealing member 100. The first tapered surface 112 is a surface that a retainer gland comes into contact with and is pressed by the retainer gland in the state of sealing with the sealing member 100 (described later).

An angle of an acute angle formed by the first tapered surface 112 and the first imaginary straight line L1 can be determined as appropriate from a range of 30 degrees to 60 degrees, from the viewpoint that the first pressing part 110 generates a sufficient force to press the first side part of the gap (described later) when the first tapered surface 112 receives a pressing force and is pressed in the X2 direction.

In the cross-sectional shape of the sealing member 100, the first cutout end part 113 is a part that is formed by cutting out a part in which a line extending from the first tapered surface 112 and a line extending from the first side surface 111 intersect with each other. In the cross-sectional shape of the sealing member 100, the first cutout end part 113 is formed by connecting the first end edge of the first tapered surface 112 and a first end edge of the first side surface 111.

[Configuration of Second Pressing Part]

The second side surface 121 is a second side surface of the second pressing part 120, and is a part of an outer circumferential surface of the sealing member 100 having a toric shape. The second side surface 121 is a surface that comes into contact with the second side part of the gap in the state of sealing with the sealing member 100. The second side surface 121 is a tapered surface that is configured such that, with reference to the first imaginary straight line L1 and the second imaginary straight line L2, a distance between the tapered surface and the first imaginary straight line L1 gradually reduces toward the first end edge of the second side surface 121.

An angle of an acute angle formed by the second side surface 121 and the second imaginary straight line L2 can be determined as appropriate from a range of 0.5 degrees to 5 degrees, from the viewpoint of increasing a force exerted by the second pressing part 120 so as to press the second side part of the gap (described later) and from the viewpoint of increasing distribution of the force in the X direction.

The second tapered surface 122 is a surface that is exposed at a second end side of the second pressing part 120. The first tapered surface 112 is an inclined surface that is configured such that, in the cross-sectional shape of the sealing member 100, a distance from the second side surface 121 to the inclined surface gradually reduces toward the second end of the sealing member 100. Inclination of the second tapered surface 122 with respect to the second side surface 121 is designed to be gentler than inclination of a contact part of the gap with respect to the second side part of the gap (described later). Thus, the second tapered surface 122 forms, together with the contact part, a gap of which a cross-sectional shape is a wedge shape, when an extreme end part of the second tapered surface 122 comes into contact with the contact part of the gap. Since the sealing member 100 is made of a resin, the sealing member 100 has elasticity. Therefore, at the time of the sealing, the sealing member 100 is pressed and compressed by the retainer gland, and the second tapered surface 122 consequently comes into close contact with a tapered surface of the contact part (described later). In this manner, an inclination angle of the second tapered surface 122 with respect to the second side surface 121 in a state of not sealing with the sealing member 100 is designed to be smaller than the inclination angle in the state of sealing with the sealing member 100.

An angle of an acute angle formed by the second tapered surface 122 and the second imaginary straight line L2 can be determined as appropriate from a range of 30 degrees to 60 degrees, from the viewpoint that the second pressing part 120 generates a sufficient force to press the second side part of the gap (described later) when the first tapered surface 112 receives the pressing force in the X2 direction.

Further, an angle of an acute angle formed by the second tapered surface 122 with respect to the contact part (described later) before the sealing, i.e., an angle of a wedge of the above-described wedge-shaped gap, can be determined as appropriate from a range of approximately 3 degrees to 10 degrees, from the viewpoint of sufficiently causing deformation of the sealing member 100 which deformation results from strain of the sealing member 100 (described later).

In the cross-sectional shape of the sealing member 100, the second cutout end part 123 is a part that is formed by cutting out a part in which a line extending from the second tapered surface 122 and a line extending from the second side surface 121 intersect with each other. In the cross-sectional shape of the sealing member 100, the second cutout end part 123 is formed by connecting the second end edge of the second tapered surface 122 and a second end edge of the second side surface 121.

[Configuration of Connection Part]

The connection part 130 is a part in which a second end part of the first pressing part 110 and a first end part of the second pressing part 120 are overlapped and joined in a radial direction of the sealing member 100.

[Example Use of Sealing Member]

[Outline of Configuration of Valve]

Figure 3:
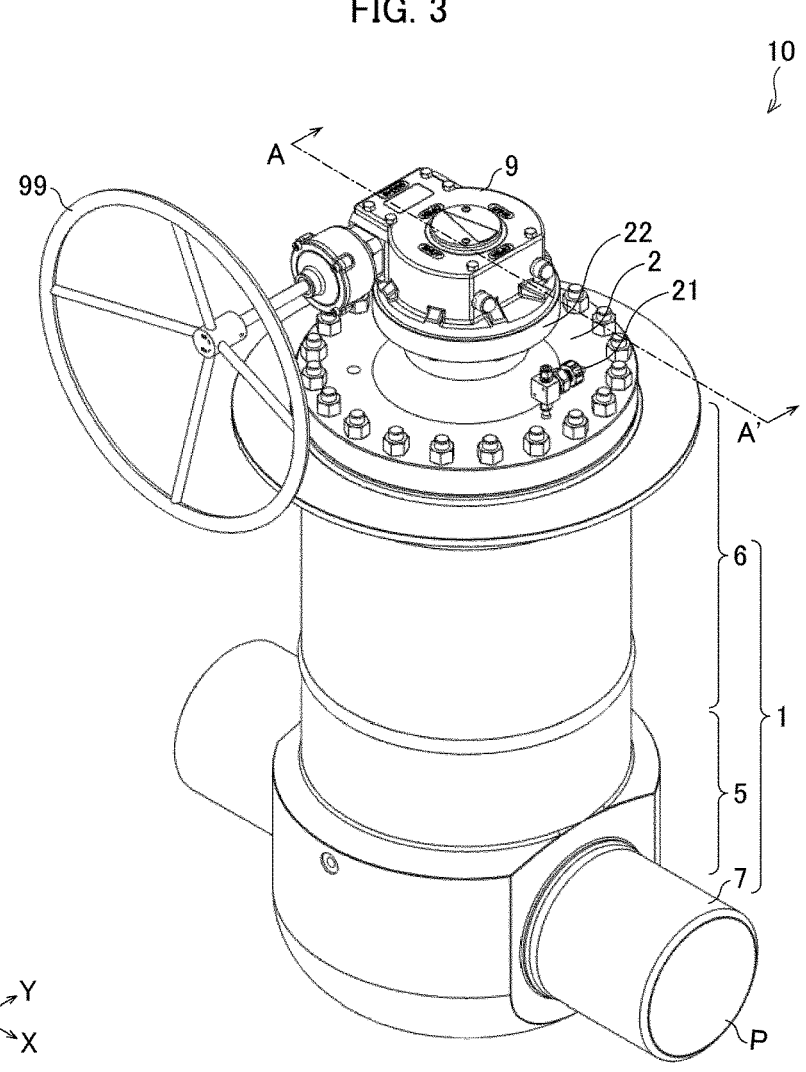
FIG. 3 schematically illustrates an example appearance of a valve to which the sealing member in accordance with an embodiment of the present invention is applied.
Figure 4:
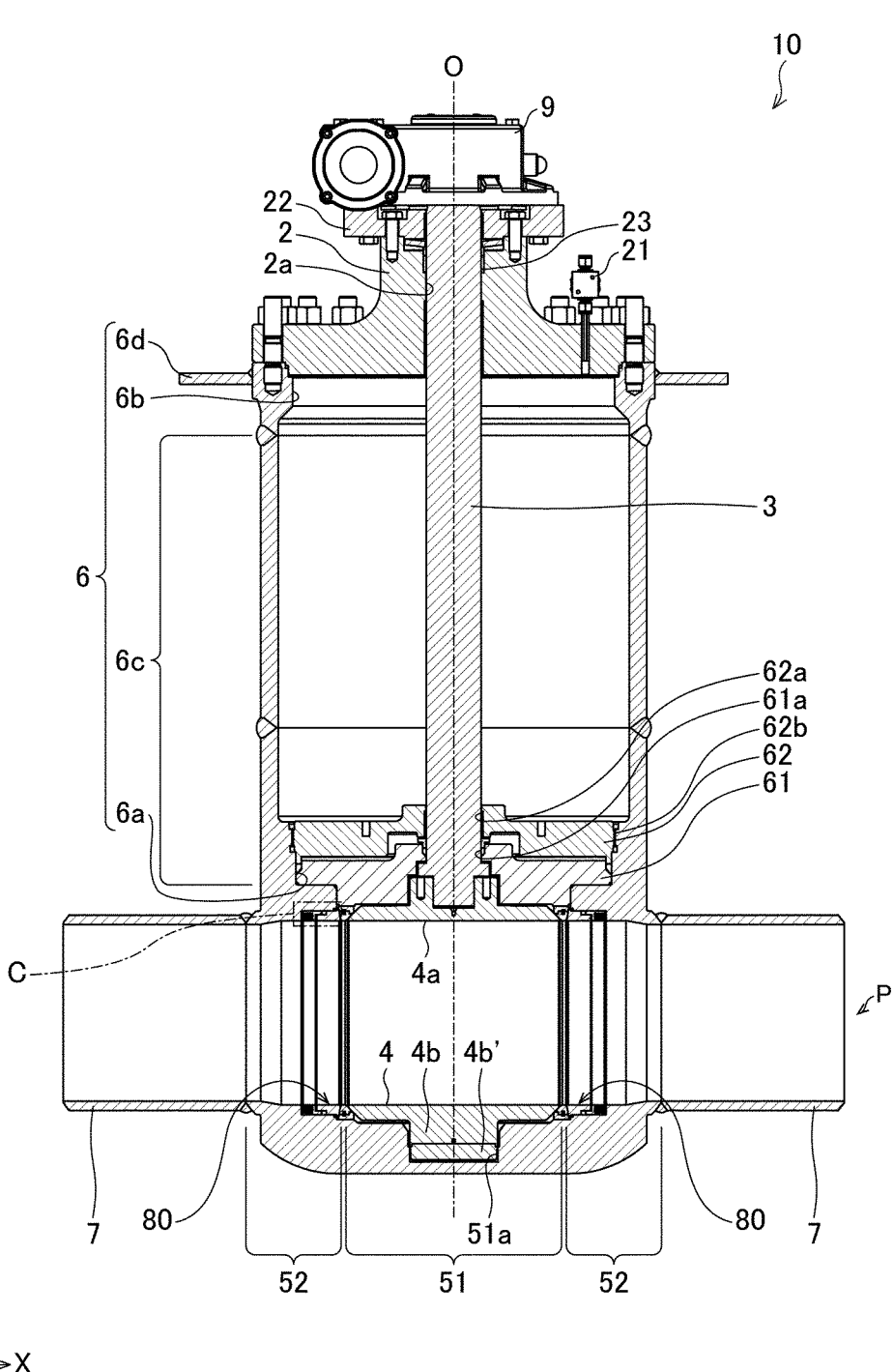
FIG. 4 is a cross-sectional view illustrating the valve taken along a line B-B illustrated in FIG. 3.

Next, an embodiment of use of the sealing member 100 is described. The following description discusses an embodiment of application of the sealing member 100 to a trunnion-type ball valve. First, a configuration of the valve to which the sealing member 100 is applied is roughly described. FIG. 3 schematically illustrates an example appearance of the valve to which the sealing member in accordance with an embodiment of the present invention is applied. FIG. 4 is a cross-sectional view illustrating the valve taken along a line B-B illustrated in FIG. 3. In FIGS. 3 and 4, a direction along an axis of a flow path of the valve is denoted by X, a vertical direction is denoted by Z, and a direction perpendicular to both the X direction and the Z direction is denoted by Y.

The valve 10 includes a body 1, a bonnet 2, a stem 3, a ball 4 which is a valve element, and an operation section 9, as illustrated in FIGS. 3 and 4.

The body 1 is a welded structure in which the valve element is housed and the stem connected to the valve element is housed in an upper part thereof. The body 1 includes a valve element housing section 5, a stem housing section 6, and a piping structure section 7.

The valve element housing section 5 includes: a hollow central region 51 in which the ball 4 can be rotatably disposed; and an end region 52 which is in communication with a hollow part of the central region 51 and an inside of the piping structure section 7. The central region 51 has an inner surface that is in contact with a lower surface of the ball 4. In the inner surface, a recess 51a is open in which a protrusion 4b of the ball 4 (described later) is fitted.

The stem housing section 6 is a part for housing the stem 3 therein. The stem housing section 6 includes: a communication port 6a that is in communication with the hollow part of the central region 51 and an internal space of the stem housing section 6; an upper end opening 6b that is open in an upper end part of the stem housing section 6; an intermediate part 6c that is located between a lower end part and the upper end part of the stem housing section 6; and a flange part 6d that extends in a lateral direction in the upper end part of the stem housing section 6.

The piping structure section 7 extends in a horizontal direction from a side surface of the valve element housing section 5. A pipe is disposed in the piping structure section 7. The pipe is in communication with the hollow part of the central region 51 with the end region 52 of the valve element housing section 5 therebetween.

The bonnet 2 is a structure for operably holding the stem 3 and hermetically sealing the stem housing section 6. The bonnet 2 is detachably connected to an upper end part of the body 1 with a bolt or the like so as to hermetically seal the upper end opening 6b.

The bonnet 2 includes: a through-opening part 2a through which the stem 3 is inserted; a purge valve 21 which is for purging gas in a hollow part of the body 1; a gland plate 22 which is connected to an upper end of the stem 3 and which is for connecting the upper end of the stem 3 and the operation section 9; and a gland packing 23 which is for preventing leakage of a fluid from around the stem 3.

The stem 3 constitutes a valve shaft of the valve 10. The stem 3 is connected to the ball 4 which is the valve element, and extends outside the upper end opening 6b. The stem 3 is operably supported by the through-opening part 2a of the bonnet 2.

The ball 4 is substantially a sphere that is housed in the valve element housing section 5. The ball 4 has a through hole 4a that serves as a flow path P and the protrusion 4b that protrudes along the Z direction from a side opposite to a connection part between the ball 4 and the stem 3. The protrusion 4b is fitted in the recess 51a of the valve element housing section 5. Note that the protrusion 4b has, on an extreme end part thereof, a protruding end 4b' that is smaller in diameter than the protrusion 4b, from the viewpoint of further facilitating fitting of the protrusion 4b in the recess 51a.

The valve 10 further includes a trunnion plate 61 and a yoke plate 62 in this order along the Z direction from a ball 4 side. The trunnion plate 61 has, in a center thereof, a through hole 61a through which the stem 3 is inserted. The yoke plate 62 has, in a center thereof, a through hole 62a through which the stem 3 is inserted. The yoke plate 62 has a first screw structure on an outer circumferential surface 62b thereof. Note that a second screw structure that is screwed into the first screw structure is also provided on an inner circumferential surface of the stem housing section 6 of the body 1. Screwing these screw structures fixes the yoke plate 62 in an axial direction of the stem housing section 6.

The operation section 9 is fixed to the bonnet 2, and has a handle 99. According to an amount of rotation of the handle 99, the ball 4 connected to the stem 3 rotates about a central axis O (FIG. 2) that extends in the vertical direction. In this manner, the handle 99 is used for an operation of opening and closing the valve with use of the ball 4 via the stem 3.

The valve 10 also includes a sealing mechanism 80 for sealing a fluid that flows in the flow path P of the ball 4.

The valve 10 described above includes the stem housing section 6 which is cylindrical with substantially no change in diameter and which has a space independent from the valve element housing section 5. Thus, heat of the fluid is unlikely to reach the bonnet 2 from the ball 4. Therefore, the valve 10 is applicable also to an ultra-low-temperature fluid that has heat cold enough to, in the case of a typical valve, freeze the operation section 9 and make it impossible to operate the operation section 9. For example, the valve 10 can be used for a valve for opening and closing a pipe through which liquid hydrogen flows. The valve 10 can exhibit excellent sealing properties due to the sealing member 100 in accordance with the present embodiment, in a case where the valve 10 is used for a low-temperature fluid having a temperature of not higher than −50° C., particularly, not higher than −100° C. and further for an ultra-low-temperature fluid such as liquefied nitrogen (−196° C.) or liquefied hydrogen (−253° C.).

[Configuration Concerning Sealing Member]

Figure 5:
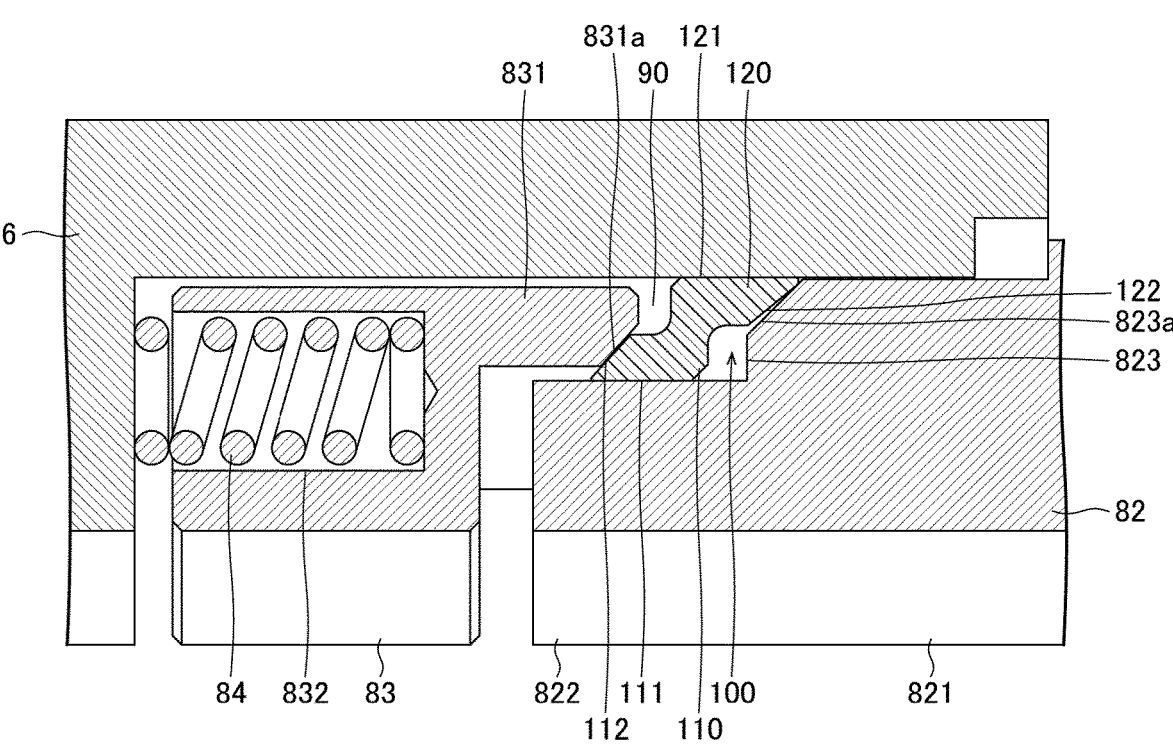
FIG. 5 is an enlarged cross-sectional view illustrating a state where the sealing member is inserted in a gap, in an area C enclosed by a dotted and dashed line illustrated in FIG. 4.
Figure 5:
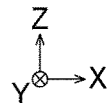

Next, in the configuration of the valve, a configuration concerning the sealing member is described. FIG. 5 is an enlarged cross-sectional view illustrating a configuration in an area C enclosed by a dotted and dashed line illustrated in FIG. 4.

The sealing mechanism 80 described above includes, from a ball 4 side, a ball seat 82 that comes into contact with the ball 4 from a piping structure section 7 side, a retainer gland 83 that presses the ball seat 82 from the piping structure section 7 side, and the sealing member 100 that is interposed between the ball seat 82 and the retainer gland 83. The valve 10 has a gap 90 that is surrounded by the ball seat 82, the body 1 (a boundary part between the stem housing section 6 and the valve element housing section 5), and the retainer gland 83. The sealing member 100 is pressed toward the ball seat 82 by the retainer gland 83.

The ball seat 82 is a member which has a toric shape and of which an axial direction is the X direction, and is inscribed in the body 1. The ball seat 82 has a large-diameter part 821 that is located on a ball seat 82 side, a small-diameter part 822 that is located on a retainer gland 83 side, and a step part 823 that broadens radially from the small-diameter part 822 and that connects the small-diameter part 822 and the large-diameter part 821. The gap 90 is formed between the ball seat 82 and the body 1. The gap 90 has the step part 823 as a bottom surface, has an outer circumferential wall surface of the small-diameter part 822 of the ball seat 82 as a first side part, and has, as a second side part, a part of an inner circumferential wall surface of the body 1 which part faces the first side part.

Note that, in the present embodiment, a member which is shaped such that a sealing part that comes into contact with the ball 4 extends, as it is, to the piping structure section 7 side is taken as an example of the ball seat 82. However, the present invention is not limited to such an example. For example, a "seat member" which is structured such that a seat that comes into contact with the ball 4 is held, from the piping structure section 7 side, by a seat retainer that is a separate member may be applied instead of the ball seat 82. In that case, a rear end, which is located on the piping structure section 7 side, of the seat retainer that holds the seat on the ball 4 side is pressed by the retainer gland 83. In this case, the sealing member 100 in accordance with the present embodiment may be applied between the seat and the seat retainer of the seat member, or may be alternatively applied between the seat retainer and the retainer gland 83, or may be alternatively applied between the seat and the seat retainer and between the seat retainer and the retainer gland 83.

The step part 823 includes a contact part 823*a* on an outer circumference side thereof. The contact part 823*a* is a part of the gap 90 with which part the second tapered surface 122 of the sealing member 100 comes into contact in the state of sealing with the sealing member 100. The contact part 823*a* includes a tapered surface. The tapered surface is located on a side of the gap 90 on which side an inner circumferential wall of the stem housing section 6 is located (second side part side of the gap 90), and is configured such that a distance from the tapered surface to the inner circumferential wall gradually reduces along the depth direction of the gap 90 which depth direction is along the X direction. An angle of an acute angle formed by the tapered surface and an inner circumferential wall surface of the stem housing section 6 is slightly larger than that of an acute angle formed by the second tapered surface 122 and the second side surface 121 of the sealing member 100. A difference between these angles is approximately 3 degrees to 10 degrees.

The retainer gland 83 has: a pressing part 831 which can enter the gap 90 along the X direction; and a spring housing part 832 in which the coil spring 84 that biases the retainer gland 83 is housed. The pressing part 831 has a tapered pressing surface 831*a*. An angle of an acute angle formed by the pressing surface 831*a* and the outer circumferential wall surface of the small-diameter part 822 of the ball seat 82 is, for example, 40 degrees to 55 degrees.

Figure 6:
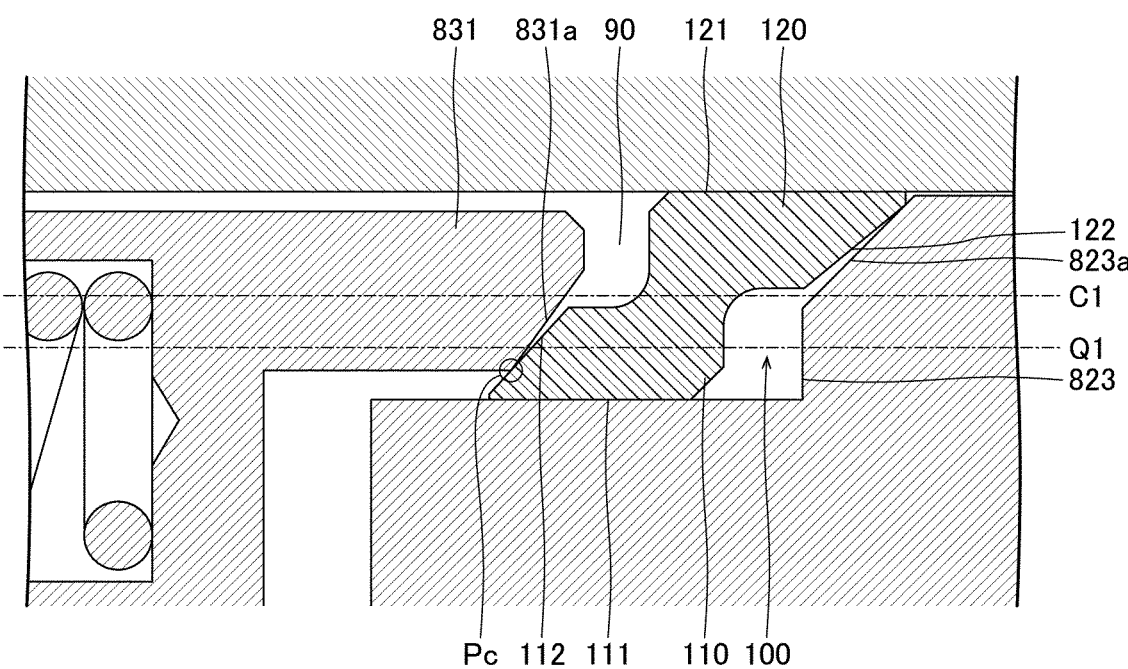
FIG. 6 illustrates, in an enlarged manner, the sealing member and a vicinity thereof illustrated in FIG. 5.
Figure 6:
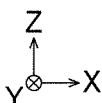

FIG. 6 illustrates, in an enlarged manner, the sealing member and a vicinity thereof illustrated in FIG. 5. In a case where a distance between a first side (the outer circumferential wall surface of the small-diameter part 822) and a second side (the inner circumferential wall surface of the stem housing section 6) of the gap 90 is regarded as a width of the gap 90, the first pressing part 110 is most strongly pressed, by the pressing part 831, at a position in the first tapered surface 112 which position is located between a position of ¼ and a position of ⅛ close to the first side of the gap 90 in a width direction of the gap 90. Note that the width direction of the gap 90 is indicated by the above-described Z direction.

The pressing part 831 has: a first side edge that is located at the position of ¼ or below close to the first side of the gap 90 in the width direction of the gap 90; and the tapered pressing surface 831*a* that is configured such that a distance from a first side surface of the gap 90 to the pressing surface 831*a* gradually increases toward a second end side of the gap 90. More specifically, when the pressing part 831 presses the first tapered surface 112, the pressing part 831 comes into contact with, at a contact position Pc, the first tapered surface 112. The contact position Pc is located at Q1 or below from the inner circumferential wall surface of the stem housing section 6 in the Z direction. Note, here, that a line C1 is a line passing through the center of the distance from the outer circumferential wall surface of the small-diameter part 822 to the inner circumferential wall surface of the stem housing section 6 in the Z direction (the width of the gap). A line Q1 is a line indicating the position of ¼ of the width of the gap from the inner circumferential wall surface of the stem housing section 6 in the Z direction. A first side edge of the pressing surface 831*a* (a lower end surface of the pressing surface 831*a* in FIG. 6) is located on an inner circumference side of the line Q1. Note that the position at which the pressing part 831 most strongly presses the first pressing part 110, i.e., the position at which the pressing part 831 attempting to press the sealing member 100 first comes into contact with the sealing member 100, is the position which is located between the position of ¼ and the position of ⅛ close to the first side of the gap 90, and is, for example, the position of ⅛ (the position of ¼ on an inner circumferential wall side between the inner circumferential wall surface of the stem housing section 6 and the line C1).

Further, the pressing surface 831*a* is formed such that an angle formed by the pressing surface 831*a* with respect to the first side surface of the gap is larger than an angle formed by the first tapered surface with respect to the first side surface. More specifically, the angle of the acute angle formed by the pressing surface 831*a* and the outer circumferential wall surface of the small-diameter part 822 of the ball seat 82 is defined as a pressing surface inclination angle Aa, and an angle of an acute angle formed by the first tapered surface 112 and the inner circumferential wall surface of the small-diameter part 822 when the sealing member 100 is inserted into the gap is defined as a first tapered surface inclination angle Ab. In this case, the angle Aa is slightly larger than the angle Ab. Note that the angle Ab is substantially the same as an angle of an acute angle formed by the first tapered surface 112 and the first side surface 111 in the cross section of the sealing member 100.

The spring housing part 832 is a recess that is open on a side opposite to the pressing part 831 in the X direction and that has a cylindrical internal space having an axis along the X direction. In the spring housing part 832, the coil spring 84 is housed.

In this manner, the sealing member 100 is disposed in the gap 90 that is formed between the step part 823 of the ball seat 82 and the body 1 in the valve 10. Then, the sealing member 100 is pressed toward the ball seat 82 by the retainer gland 83 at the time of the sealing.

The first pressing part 110 is disposed close to the first side of the sealing member 100 and the first end of the sealing member 100. Therefore, in the gap 90, the first side surface 111 of the sealing member 100 is in close contact with the outer circumferential wall surface of the small-diameter part 822 of the ball seat 82 (the first side part of the gap 90). In this manner, while the sealing member 100 is disposed in the gap 90, the first pressing part 110 is in contact with the outer circumferential wall surface of the small-diameter part 822 of the ball seat 82, but is apart from the inner circumferential wall surface of the body 1 (the second side part of the gap 90).

The second pressing part 120 is disposed close to the second side of the sealing member 100 and the second end of the sealing member 100. Therefore, in the gap 90, the second side surface 121 of the sealing member 100 is in close contact with the inner circumferential wall surface of the stem housing section 6. In this manner, while the sealing member 100 is disposed in the gap 90, the second pressing part 120 is in contact with the inner circumferential wall surface of the body 1, but is apart from the outer circumferential wall surface of the small-diameter part 822. With the first tapered surface 112 of the sealing member 100, the pressing surface 831*a* of the pressing part 831 of the retainer gland 83 is in contact.

An inclination angle of the first tapered surface 112 with respect to the first imaginary straight line L1 and an inclination angle of the pressing surface 831*a* with respect to the first imaginary straight line L1 are substantially the same, but the first side surface 111 is a tapered surface that is tapered with respect to the first imaginary straight line L1. Therefore, in a state where the sealing member 100 is inserted in the gap 90, the first tapered surface 112 is more inclined with respect to the pressing surface 831*a* by an amount corresponding to an inclination angle at which the first side surface 111 is tapered.

An extreme end part of the second pressing part 120 of the sealing member 100 reaches a boundary part between the tapered surface of the contact part 823*a* of the step part 823 and the inner circumferential wall surface of the body 1. As described above, the angle of the second tapered surface 122 of the second pressing part 120 is smaller than the angle of the acute angle formed by the tapered surface of the contact part 823*a* and the inner circumferential wall of the stem housing section 6. Thus, at a point in time when the sealing member 100 reaches a far end of the gap 90, a specific gap of which a cross-sectional shape is a wedge shape is formed between the second tapered surface 122 and the tapered surface of the contact part 823*a*. Thus, when the second tapered surface 122 forms a wedge-shaped gap together with the tapered surface of the contact part 823*a* in the cross-sectional shape, the second tapered surface 122 is such that a distance from the inner circumferential wall surface of the body 1 to the second tapered surface 122 and a distance from the tapered surface of the contact part 823*a* to the second tapered surface 122 both gradually decrease in the X2 direction.

[State During Sealing]

Figure 7:
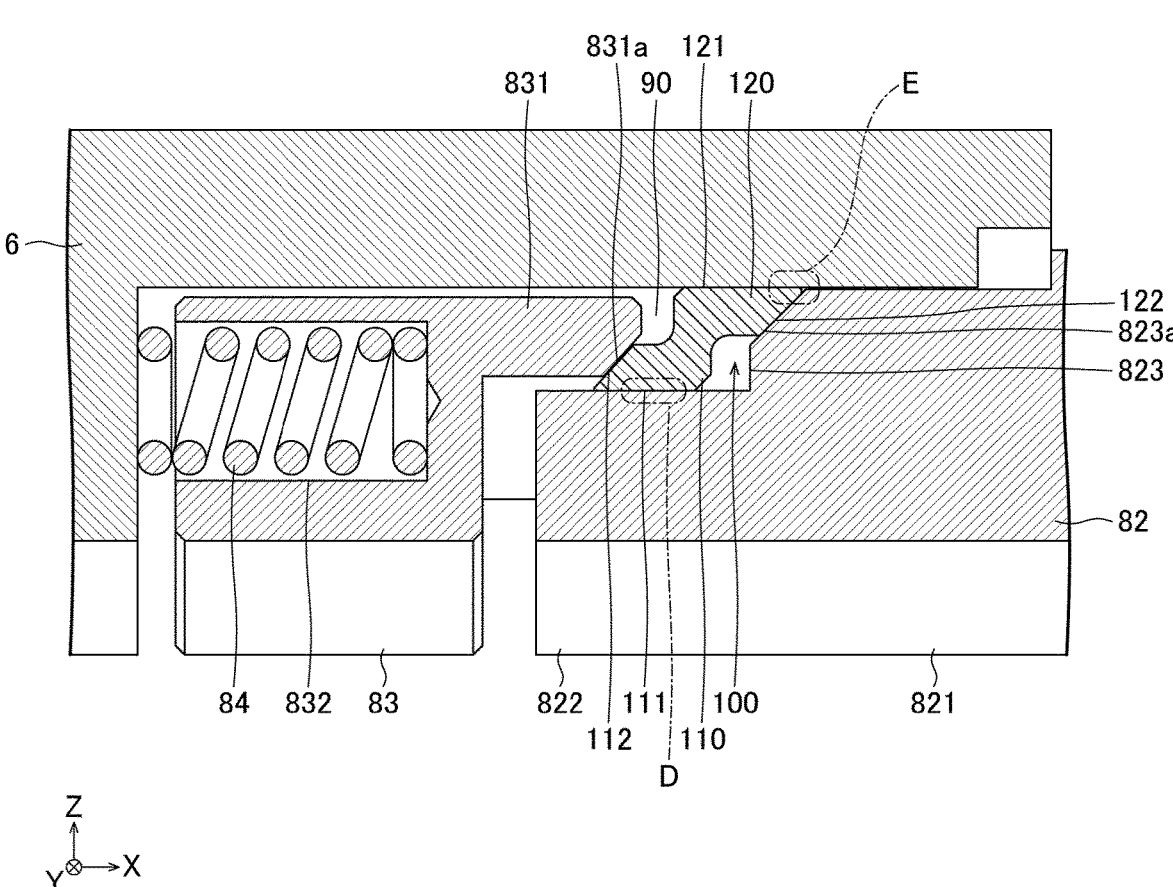
FIG. 7 is an enlarged cross-sectional view illustrating a state of sealing with the sealing member, in the area C enclosed by the dotted and dashed line illustrated in FIG. 4.

Next, a state of the sealing member that seals the gap is described. The sealing member 100 is disposed in the gap 90 of the valve 10, and is pressed toward the ball seat 82 with use of the retainer gland 83. As a result, the gap 90 is sealed. FIG. 7 is an enlarged cross-sectional view illustrating a state of sealing with the sealing member, in the area C enclosed by the dotted and dashed line illustrated in FIG. 4.

[State of Sealing in First Side Part of Gap]

The retainer gland 83 is biased by the coil spring 84 toward the ball seat 82 along the X direction. The pressing surface 831*a* of the pressing part 831 of the retainer gland 83 first comes into contact with, on a first side part side of the gap 90, the first tapered surface 112 of the sealing member 100. Next, the pressing surface 831*a* comes into close contact with the first tapered surface 112. During this time, the pressing surface 831*a* presses the sealing member 100 toward the ball seat 82 along the X direction.

In the sealing member 100, the first side surface 111 and the second side surface 121 are both inclined with respect to the first imaginary straight line L1 and the second imaginary straight line L2. Thus, as compared to a case where the sealing member 100 is inserted into the gap 90 along the first imaginary straight line L1 and the second imaginary straight line L2, the first tapered surface 112 is inclined to a contact part 823*a* side by the same amount as inclination of the first side surface 111. Thus, a first side edge part of the pressing surface 831*a* comes into contact with a first side part of the first tapered surface 112.

In a case where the pressing surface 831*a* comes into contact with the first tapered surface 112 at the first side part of the first tapered surface 112, the first tapered surface 112 is pressed by the pressing surface 831*a*. Thus, the first tapered surface 112 is strongly pressed by the pressing surface 831*a*, and then a part of the first side surface 111 which part corresponds to a part of the first tapered surface 112 which part is strongly pressed strongly presses an outer circumferential wall surface of the ball seat 82.

In a case where the pressing surface 831*a* further strongly presses the first tapered surface 112, the pressing surface 831*a* and the first tapered surface 112 come into contact with each other on their tapered surfaces with no gap between the pressing surface 831*a* and the first tapered surface 112, and then the pressing surface 831*a* further strongly presses the first tapered surface 112. Thus, due to surface contact between these tapered surfaces, the pressing force exerted by the retainer gland 83 in the X direction is converted into a force in the X direction and a force in a direction of the outer circumferential wall surface of the ball seat 82. As a result, the first pressing part 110 of the sealing member 100 is pressed along the X direction and also pressed toward the outer circumferential wall surface of the ball seat 82 with a sufficiently strong force. In this manner, when the sealing member 100 is disposed in the gap 90, the first pressing part 110 is located on an opening side of the gap 90 and on a side of the gap 90 on which side the outer circumferential wall surface of the small-diameter part 822 is located, out of the opposing side parts of the gap 90. When the first pressing part 110 is pressed from the opening side, the first pressing part 110 is sufficiently strongly pressed against the outer circumferential wall surface of the small-diameter part 822.

[State of Sealing in Second Side Part of Gap]

By pressing by the retainer gland 83 in the X direction, the sealing member 100 abuts on the step part 823 of the gap 90 and is further pressed. This pressing causes the wedge-shaped gap between the second tapered surface 122 and the tapered surface of the contact part 823*a* to disappear, so that the second tapered surface 122 comes into close contact with the tapered surface of the contact part 823*a*. As the wedge-shaped gap is closed up due to the close contact, a torsional force occurs which causes a second end part of the second pressing part 120 to be directed to the second side part of the gap 90, so that the deformation of the sealing member 100 which deformation results from the strain of the sealing member 100 is induced. Then, the extreme end part of the second pressing part 120 is pressed, with a sufficiently strong force, in a direction in which the sealing member 100 is opened, i.e., toward the inner circumferential wall surface of the body 1. In this manner, the second tapered surface 122 is a deformation inducing part that induces the deformation of the sealing member 100 which deformation results from the strain of the sealing member 100.

Further, by the pressing by the retainer gland 83, the first pressing part 110 moves to a ball seat 82 side along the X direction, and accordingly, the second pressing part 120 also moves to the ball seat 82 side along the X direction. At this time, a gap is present between the first pressing part 110 and the ball seat 82. Thus, the first pressing part 110 has room to move in the gap along the X direction, until the first pressing part 110 comes into contact with the ball seat 82. Meanwhile, the second end edge of the second tapered surface of the second pressing part 120 reaches the tapered surface of the contact part 823*a* from the beginning. Thus, an amount of movement of the second pressing part 120 by the pressing is such that the above-described wedge-shaped gap between the second tapered surface 122 and the tapered surface of the contact part 823*a* is closed up.

Further, the first pressing part 110 is apart from the inner circumferential wall surface of the stem housing section 6, and therefore a gap is present between the second pressing part 120 and the retainer gland 83. In this manner, the second pressing part 120 is apart from the retainer gland 83, and is not directly pressed by the retainer gland 83. Thus, even in a case where the first pressing part 110 is pressed by the retainer gland 83, the second pressing part 120 is not pressed in the X direction any more. Therefore, the amount of the movement of the second pressing part 120 in the X direction is significantly smaller than an amount of movement of the first pressing part 110 in the X direction. Accordingly, a difference in the amount of the movement between the first pressing part 110 and the second pressing part 120 that border in the connection part 130 and a vicinity thereof induces the deformation of the sealing member 100 which deformation results from the strain of the sealing member 100 such that the second pressing part 120 is directed to the second side part of the gap 90. In this manner, the first pressing part 110 that is disposed in the gap 90 so as to be apart from the second side part of the gap 90 and the inner circumferential wall surface of the stem housing section 6 is a deformation inducing part that induces the deformation of the sealing member 100 which deformation results from the strain of the sealing member 100.

Further, by a first end side of the first side surface 111 being pressed more strongly, taper of the first side surface 111 is made level so as to be close to the first imaginary straight line L1 in the cross section of the sealing member 100. This causes a force that causes the sealing member 100 to have a posture such that the entire sealing member 100 faces up to the second end side and a second side part side of the sealing member 100. Note, however, that the second pressing part 120 cannot move to the second end side and the second side part side. Thus, the force becomes a force that strains the sealing member 100 such that the second pressing part 120 is directed to the second side part of the gap 90. In this manner, also because the first side surface 111 is the described-above tapered surface, the deformation of the sealing member 100, which deformation results from the strain of the sealing member 100 such that the second pressing part 120 is directed to the second side part of the gap 90, is induced. In this manner, the tapered surface of the first side surface 111 is a deformation inducing part that induces the deformation of the sealing member 100 which deformation results from the strain of the sealing member 100.

Moreover, the sealing member 100 includes the connection part 130 that makes the cross-sectional shape constricted in a central part thereof. Therefore, the difference in the amount of the movement in the X direction between the first pressing part 110 and the second pressing part 120 easily arises, and accordingly, the above-described straining force more easily occur. Thus, the effect of concentration of the pressing force on the extreme end part of the second pressing part 120 is further increased. Thus, the connection part 130 is also a deformation inducing part that induces the deformation which strains the sealing member 100 such that the second pressing part 120 is directed to the inner circumferential wall surface of the stem housing section 6.

In this manner, in the present embodiment, the pressing force exerted by the retainer gland 83 in the X direction is converted into the force in the X direction and the force toward the outer circumferential wall surface of the ball seat 82, and then results in a force that induces the deformation of the sealing member 100 which deformation results from the strain of the sealing member 100 and that sufficiently strongly presses the second pressing part 120 toward the inner circumferential wall surface of the body 1. Further, it is considered that, by making the inclination angle of the second tapered surface 122 of the second pressing part 120 different from an inclination angle of a contact surface (the tapered surface of the contact part 823*a* of the ball seat 82), the torsional force in a counterclockwise direction with respect to the drawings also occurs in an extreme end of the second pressing part 120 and a vicinity thereof (a part close to the ball seat 82).

Furthermore, the second side surface 121 of the second pressing part 120 is a tapered surface that is inclined with respect to the second imaginary straight line L2. This causes a part of the second pressing part 120 which part is closer to the ball seat 82 to be more strongly compressed between the inner circumferential wall surface of the body 1 and the tapered surface of the contact part 823*a* of the ball seat 82. These forces combine to generate a strong surface pressure between the second pressing part 120 (particularly, the second end part) and the inner circumferential wall surface of the body 1. Similarly, since the first side surface 111 is a tapered surface that is inclined with respect to the first imaginary straight line L1, a stronger surface pressure with respect to the outer circumferential wall surface of the ball seat 82 occurs on the first end side of the first pressing part 110.

As described above, by the pressing in the X direction, the sealing member 100 is pressed against the side parts of the gap 90 and the tapered surface of the contact part 823a with a sufficiently strong force, in areas D and E each enclosed by a dotted and dashed line in FIG. 7. Therefore, by the pressing by the retainer gland 83 in the X direction, the sealing member 100 strongly comes into close contact with the outer circumferential wall of the ball seat 82 in a first end part of the sealing member 100, and the sealing member 100 strongly comes into close contact with the inner circumferential wall of the body 1 in a second end part of the sealing member 100.

In a case where a fluid flowing through the flow path P is a low-temperature fluid, the flow path P and a vicinity thereof are also caused to have a low temperature by the fluid. As this temperature becomes lower, the sealing member 100 tends to become harder, regardless of the material. Further, there is also a case where the sealing member 100 contracts, depending on the material. On the other hand, the sealing member 100 described above has an extremely advantageous structure for generating a strong surface pressure both on the ball seat 82 side and a body 1 side. Therefore, even in a case where the sealing member 100 hardens or contracts under a low-temperature condition, particularly under an ultra-low-temperature condition, it is possible for the sealing member 100 to reliably seal the gap between the ball seat 82 and the body 1. Thus, it is possible to prevent the fluid from entering a cavity in the valve 10 from the flow path P of the valve 10.

Particularly, since the sealing member 100 is made of a resin, it is possible to sufficiently deform the sealing member 100 even in an environment, such as an ultra-low-temperature environment, in which the sealing member 100 is unlikely to be deformed. Thus, by the pressing by the retainer gland 83, it is possible to more effectively exhibit a force by which the first pressing part 110 is pressed against the outer circumferential wall surface of the ball seat 82 and a force by which the second pressing part 120 is pressed against the inner circumferential wall surface of the body 1.

[Main Features for Improving Performance]

In an embodiment of the present invention, the annular sealing member 100 of which the cross-sectional shape is a substantially inverted Z shape is pressed in the depth direction of the gap 90. This provides sufficient sealing properties also in the width direction of the gap 90 in which the sealing member 100 is housed. The sealing member 100 is pressed by the retainer gland 83 from the first end side of the sealing member 100, and then the second end side (extreme end side) of the sealing member 100 presses the ball seat 82. This causes the sealing member 100 to be deformed such that the sealing member 100 is strained at a center and a vicinity thereof. This straining force provides the sealing properties in the width direction the gap 90, particularly by improvement in a sealing force on the second side of the gap 90 (to an outer diameter side).

Such a straining force occurs also in a case where the sealing member 100 is pressed so as to move in the gap 90 in parallel with the depth direction of the gap 90. In the present embodiment, various contrivances are made so as to increase the straining force.

For example, the sealing member 100 in accordance with the present embodiment includes the first beveled part 114 and the second beveled part 124. The first beveled part 114 has a shape formed by beveling a corner part between the connection part 130 and the first side surface 111. The second beveled part 124 has a shape formed by beveling a corner part between the connection part 130 and the second side surface 121. In the present embodiment, the first beveled part 114 is larger than the second beveled part 124. Since the sealing member 100 has a shape such that, with reference to the rotation axis D1, the inner diameter side of the sealing member 100 is cut off to a larger extent than the outer diameter side of the sealing member 100, the sealing member 100 is more easily deformed to the outer diameter side. Thus, in a case where the sealing member 100 is pressed along the depth direction of the gap 90 from the first end side of the sealing member 100, the second pressing part 120 that is located on the extreme end side of the sealing member 100 is easily deformed in a direction in which the second pressing part 120 broadens toward the outer diameter side of the sealing member 100. This is advantageous in causing the above-described strain.

The shape of each of the first beveled part 114 and the second beveled part 124 and a volume of a part cut off from the corner part so as to obtain each of these beveled parts may be determined as appropriate, from the viewpoint of causing the strain. In a case where any of the beveled parts is made excessively large, the first side surface 111 or the second side surface 121 becomes smaller, and the sealing properties may be weakened. In a case where a position of each of the beveled parts is made closer to the connection part 130, strength of the entire sealing member 100 may be lowered. In the cross-sectional shape of the sealing member 100, a size of each of the first beveled part 114 and the second beveled part 124 may be such that a difference in ease of strain as described above arises between a first side surface 111 side of the rotation axis D1 and a second side surface 121 side of the rotation axis D1. Thus, for example, by causing the beveled parts to have the above-described dimensional ratio (Lc1/Lc2) in beveling, an advantage of ease of strain as described above is sufficiently obtained, while the sealing properties and the strength of the sealing member 100 are sufficiently maintained.

In the present embodiment, the position at which the retainer gland 83 presses the sealing member 100 is biased more toward the inner diameter side in the width of the gap 90. The retainer gland 83 presses the sealing member 100 so that the pressing force becomes maximum at this position. By the retainer gland 83 pressing the sealing member 100 in this manner, specifically, at the position at which a distance from the first side in the width of the gap 90 is ¼ to ⅛ of the entire width, the retainer gland 83 presses the sealing member 100. By (i) a load being most applied to the above position and (ii) the first tapered surface 112 of the sealing member 100 receiving such a load, a force that presses the first pressing part 110 of the sealing member 100 to the inner diameter side (the outer circumferential surface of the small-diameter part 822) more strongly occurs. Furthermore, a force causing the above-described strain of the sealing member 100 also easily occurs. As a result, the sealing force of the sealing member 100 with respect to both the inner diameter side and the outer diameter side of the gap 90 is further increased.

In the present embodiment, the pressing by the retainer gland 83 with respect to the sealing member 100 as described above is carried out via contact between the tapered surfaces of the retainer gland 83 and the sealing member 100. In the present embodiment, in order that the retainer gland 83 most strongly presses the sealing member 100 at the above position, a taper angle of the tapered surface (the pressing surface 831*a*) of the retainer gland 83 is made slightly larger than a taper angle of the tapered surface (the first tapered surface 112) of the sealing member 100. As a result, the first side edge of the pressing surface 831*a* of the retainer gland 83 first comes into contact with the first tapered surface 112, and, in the subsequent pressing, the pressing surface 831*a* comes into close contact with the first tapered surface 112. As a result, the sealing force of the sealing member 100 with respect to both the inner diameter side and the outer diameter side of the gap 90 is further increased.

The position at which the pressing surface 831*a* first comes into contact with the first tapered surface 112 may be determined as appropriate, provided that the effects of the above-described strain and the sealing properties can be both obtained. In a case where such a contact position is excessively close to the outer circumferential surface of the small-diameter part 822 in the width direction of the gap 90, a break may occur at the first end part of the first tapered surface 112 of the sealing member 100. From the viewpoint of preventing such a break and from the viewpoint of obtaining the above effects brought about by the contact position, the contact position can be determined, as appropriate, from positions of ⅛ or above and ¼ or below close to the first side of the gap 90 as described above. From the viewpoint of the effect of improvement in the sealing properties that is brought about by the contact position, the position of ⅛ close to the first side of the gap 90 is most preferable.

Further, the sealing properties in the present embodiment also contribute to improvement in durability of the sealing member 100. In the present embodiment, as described above, the straining force that is derived from the pressing force exerted by the retainer gland 83 acts so as to enhance the sealing properties of the sealing member 100 in the width direction (both the inner diameter side and the outer diameter side) of the gap 90. Thus, changes in the volume and the shape of the sealing member 100 are small as compared to a case where the sealing properties are enhanced by deforming the sealing member 100 so that the sealing member 100 fills the gap 90. Therefore, even in a case where the sealing member 100 is used in a temperature environment in which a change in the volume of the sealing member 100 occurs, the sealing member 100 exhibits sufficient sealing properties, as compared to a sealing member that seals a gap by a change in volume or shape.

Further, the sealing member 100 in the present embodiment exhibits the sealing force by being strained with use of a load applied to the sealing member 100, rather than filling a space and closing up the gap 90. Thus, also under a condition under which even a small change occurs in the volume due to a heat cycle caused by a change in temperature in a use environment, the sealing member 100 easily maintains a desired sealing force, and has excellent durability against the change in the volume due to the heat cycle. In a case where the sealing member 100 in accordance with the present embodiment is used for a valve for a cryogenic fluid referred to as liquefied hydrogen, a heat cycle between a cryogenic temperature and an ordinary temperature can occur. Among conventional sealing members, a sealing member that seals a gap with a change in volume by pressing may easily deteriorate in sealing properties, in a case where the change in the volume occurs due to repetition of, for example, volume contraction at a cryogenic temperature and expansion at an ordinary temperature (heat cycle). As described above, the sealing member 100 in accordance with the present embodiment sufficiently has durability against a heat cycle. Thus, the sealing member 100 is suitably used in a harsh-temperature environment such as a cryogenic-temperature environment.

[Study of Sealing Strength]

Figure 8:
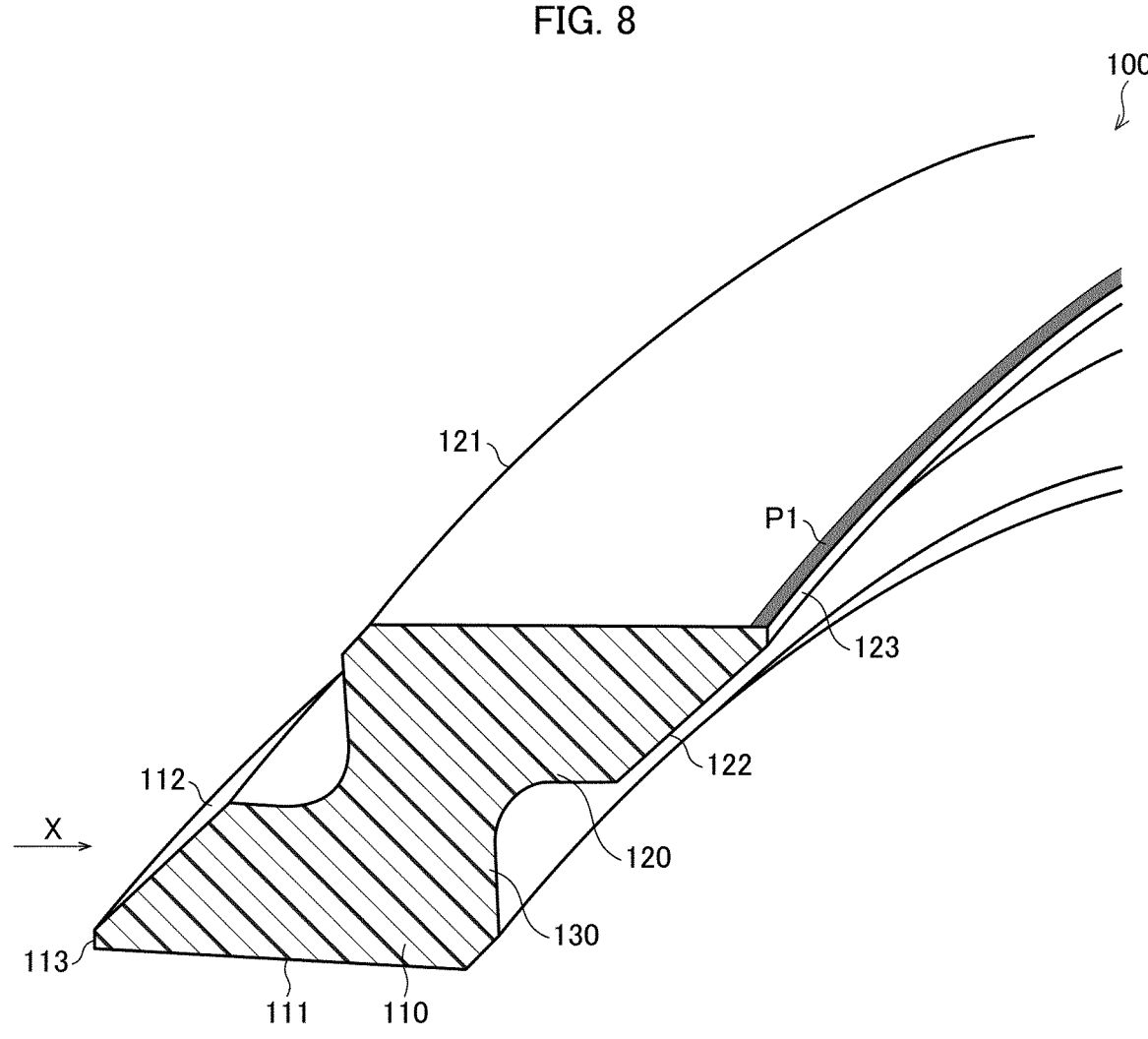
FIG. 8 is a first drawing illustrating strength and distribution of a pressing force exerted by the sealing member in accordance with an embodiment of the present invention.
Figure 9:
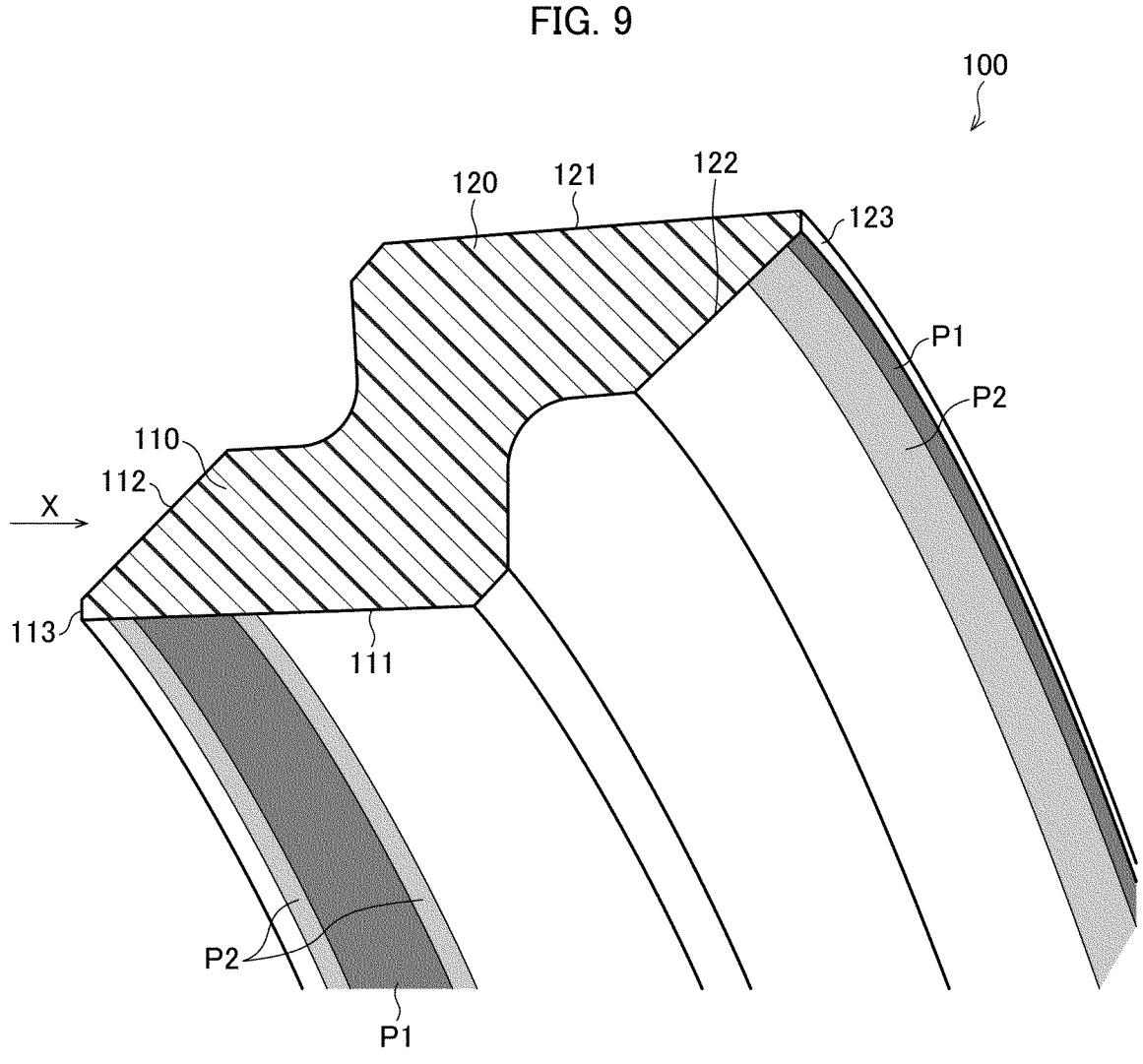
FIG. 9 is a second drawing illustrating the strength and the distribution of the pressing force exerted by the sealing member in accordance with an embodiment of the present invention.
Figure 10:
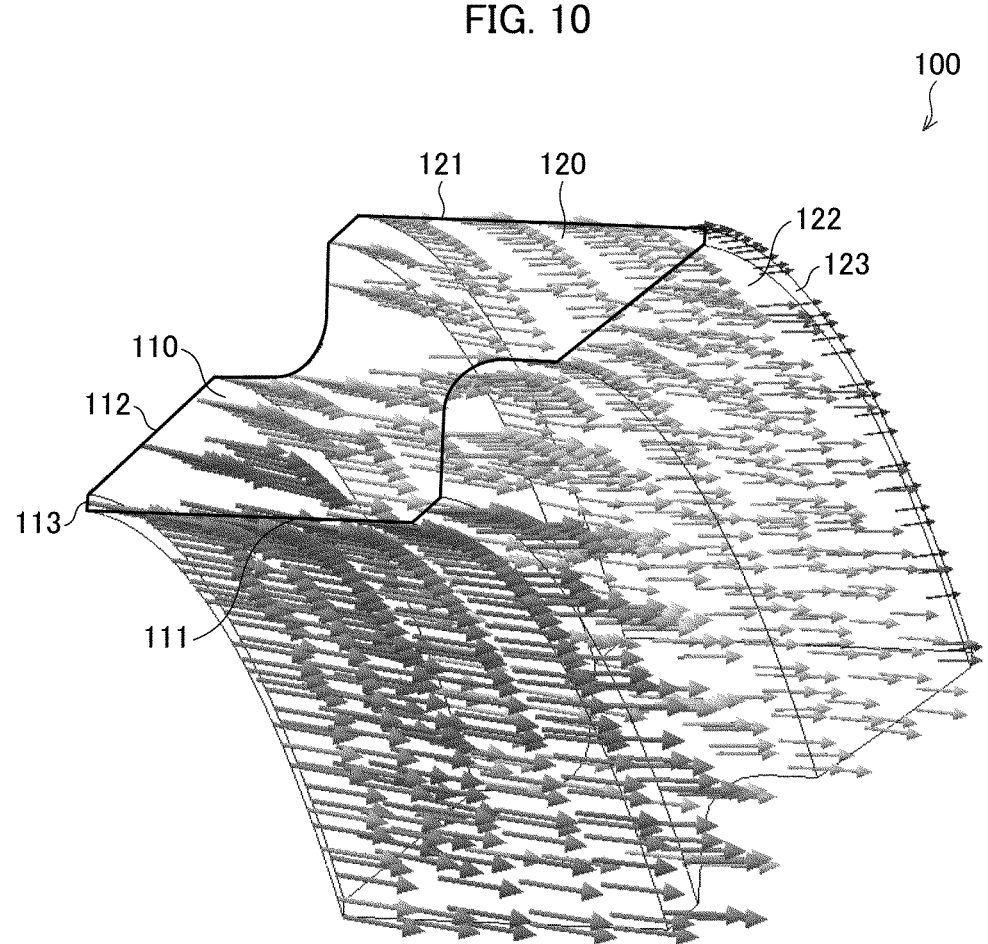
FIG. 10 is a first drawing illustrating an amount of movement of each part of the sealing member in accordance with an embodiment of the present invention.
Figure 11:
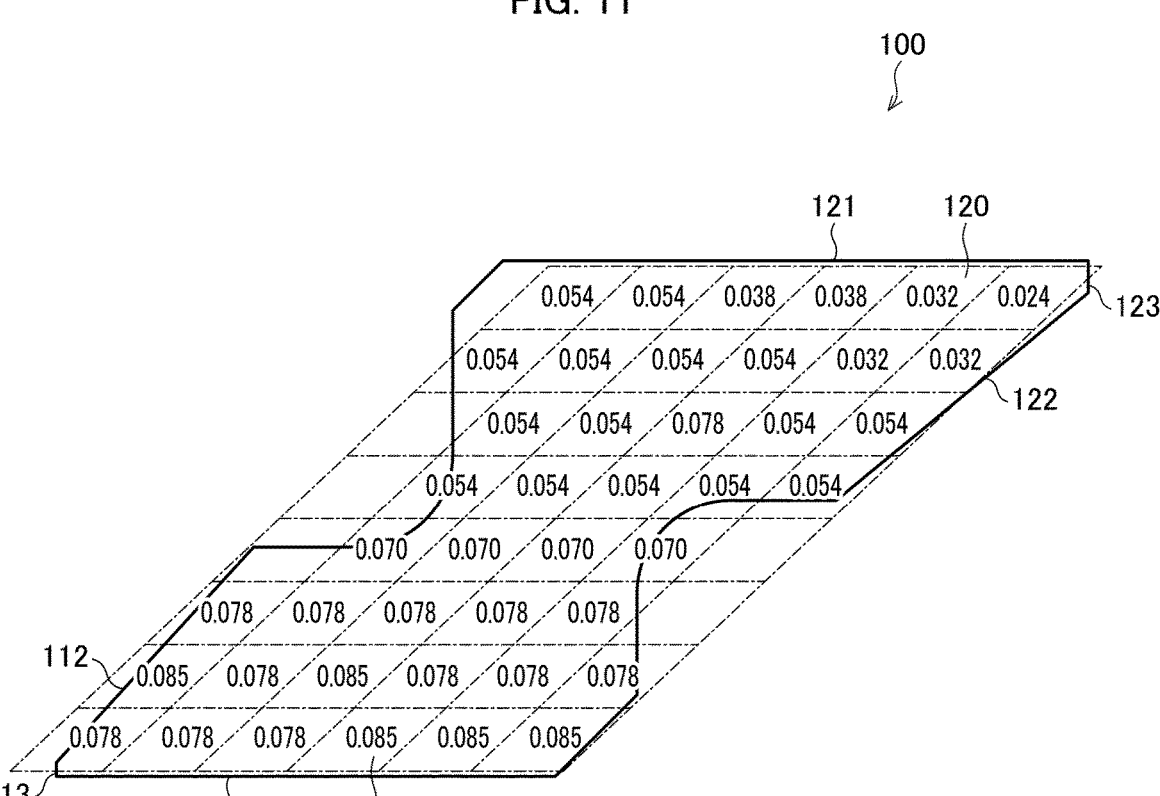
FIG. 11 is a second drawing illustrating the amount of the movement of each part of the sealing member in accordance with an embodiment of the present invention.

Next, described is a result of a computer simulation regarding strength with which the sealing member carries out pressing when the sealing member is pressed by the retainer gland. FIG. 8 is a first drawing illustrating strength and distribution of a pressing force exerted by the sealing member in accordance with an embodiment of the present invention. FIG. 9 is a second drawing illustrating the strength and the distribution of the pressing force exerted by the sealing member in accordance with an embodiment of the present invention. FIG. 10 is a first drawing illustrating an amount of movement of each part of the sealing member in accordance with an embodiment of the present invention. FIG. 11 is a second drawing illustrating the amount of the movement of each part of the sealing member in accordance with an embodiment of the present invention.

The computer simulation was carried out under the following conditions with respect to a model in which a sealing member as illustrated in FIGS. 1 and 2 was applied to a valve as illustrated in FIGS. 3 to 7. For convenience of the simulation, a first side surface and a second side surface of the sealing member were designed, not as tapered surfaces that were inclined with respect to an imaginary straight line, but as surfaces that were represented by respective first imaginary straight lines L1 and L2 in a cross-sectional shape. As a material of the sealing member, an ultra-high molecular weight polyethylene material "TI VAR UHMW-PE" (manufactured by Mitsubishi Chemical Advanced Materials, Ltd., and "TIVAR" is a registered trademark of the company) was used.

<Conditions>

Pressing force with respect to a first tapered surface: 6,000 N to 10,000 N (8,500 N at ordinary temperature)

Direction of pressing with respect to the first tapered surface: X direction

Kind of fluid: liquefied hydrogen

Temperature of fluid: −253° C.

Angle Ab of the first tapered surface: 40 degrees to 45 degrees

Contact position Pc: position of ⅛ of a gap width from an inner circumferential wall surface of a stem housing section 6 in a Z direction (position of ½ between an inner circumferential wall surface and a line Q1)

Angle of a second tapered surface: 50 degrees to 55 degrees

Angle of a reverse tapered surface: 45 degrees

Material of the sealing member: UHMW-PE

A pressure received by the sealing member under the above conditions was displayed by a change in color. In FIGS. 8 and 9, a part in a dark color is denoted by P1, and a part in a color that is dark second to P1 is denoted by P2. Each of these parts P1 and P2 is indicated by shaded lines. FIGS. 8 and 9 each illustrate that a stronger surface pressure occurs in the part in the darker color.

As illustrated in FIG. 8, on the second side surface 121 of the sealing member 100, a strong surface pressure occurs in an extreme end part of a second pressing part 120. Further, as illustrated in FIG. 9, on the second tapered surface 122 of the sealing member 100, a strong surface pressure occurs in an approximately half area on a second end side of the second pressing part 120, and particularly, the surface pressure is greater more toward the second end side. On the first side surface 111 of the sealing member 100, a strong surface pressure occurs in an approximately half area on a first end side of a first pressing part 110, and particularly, the surface pressure is greater in a central part of an area in which the strong surface pressure occurs. Further, as illustrated in FIGS. 8 and 9, these parts that receive the pressure each have a substantially constant width in a circumferential direction of the sealing member 100.

Thus, the above computer simulation indicates that, in a case where the first tapered surface 112 is pressed in the X direction, the sealing member 100 receives a pressure having the above-described distribution of strength around the entire circumference of the sealing member 100. In a case where the first side surface 111 and the second side surface 121 are, as described above, tapered surfaces that are inclined with respect to the imaginary straight line, the parts P1 and P2 on the first side surface 111 and the second side surface 121 are more widely distributed in the X direction.

In FIG. 10, a direction of an arrow indicates a direction of a force occurring in a part of the sealing member 100 which part corresponds to a base of the arrow, and a thickness of the arrow indicates magnitude of the force, in a case where the first tapered surface 112 of the first pressing part 110 is pressed in the X direction by a pressing surface 831a. Further, it is indicated that as the arrow becomes thicker, a stronger force occurs. Further, a length of the arrow indicates an amount of movement. It is indicated that as the arrow becomes longer, the amount of the movement is larger.

FIG. 11 illustrates a numerical value of the amount of the movement of each part of the sealing member 100 on a cross section of the sealing member 100, in a case where the first tapered surface of the first pressing part is pressed in the X direction by the pressing surface. The numerical value indicates a maximum value of the amount of the movement of each part which is of the cross section of the sealing member illustrated in FIG. 11 and which corresponds to a cell, the movement being caused by the pressing in the X direction. The unit is "mm".

As is clear from FIGS. 10 and 11, in a case where the first tapered surface 112 is pressed in the X direction by a retainer gland 83, the amount of the movement of the first pressing part 110 to a ball seat side is large, while the amount of the movement of the second pressing part 120 to the ball seat side is small. From the above result, it is confirmed that, by pressing the first tapered surface 112 in the X direction by the retainer gland 83, a force that causes the second pressing part 120 to be strained toward an inner circumferential wall surface side of a body 1 with a connection part 130 as a boundary occurs in the sealing member 100.

Figure 12:
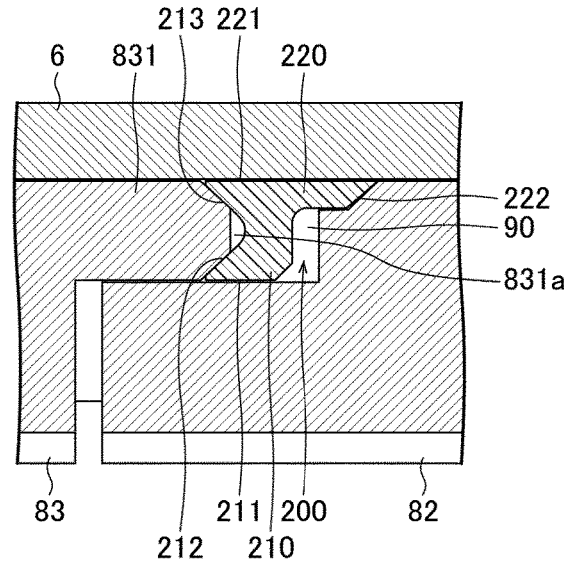
FIG. 12 is an enlarged cross-sectional view illustrating a state of sealing with a reference sealing member.
Figure 12:
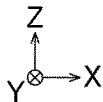

Here, a sealing member of a reference example is prepared, and compared with the sealing member in accordance with an embodiment of the present invention. FIG. 12 is a cross-sectional view schematically illustrating a state in which the sealing member of the reference example seals a gap in a valve. The sealing member 200 of the reference example has a J-like cross-sectional shape as illustrated in FIG. 12. The sealing member 200 of the reference example has the same configuration as the sealing member 100 in accordance with the above-described embodiment, except that (i) a first pressing part 210 is also present on a second side part of a gap 90 and (ii) the first pressing part 210 has a tapered surface 212 on a first side part side and a tapered surface 213 on a second side part side, the tapered surfaces 212 and 213 being pressed by a pressing surface 831a. A second pressing part 220 has the same configuration as the sealing member 100 in accordance with the above-described embodiment in that (i) a second tapered surface 222 comes into contact with a contact part of the gap 90 and (ii) a second side surface 221 comes into contact with the second side part of the gap 90. Note that, also in the sealing member 200 of the reference example, a first side surface 211 and the second side surface 221 are not tapered surfaces that are inclined with respect to an imaginary straight line, as in the computer simulation of the sealing member 100 in accordance with an embodiment of the present invention.

Figure 13:
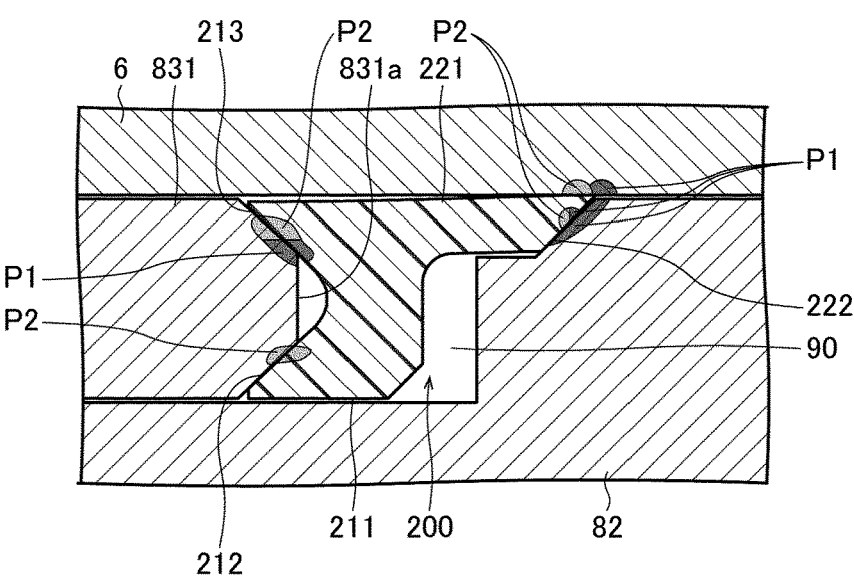
FIG. 13 is a first drawing illustrating strength and distribution of a pressing force exerted by the reference sealing member during the sealing.
Figure 13:
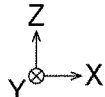
Figure 14:
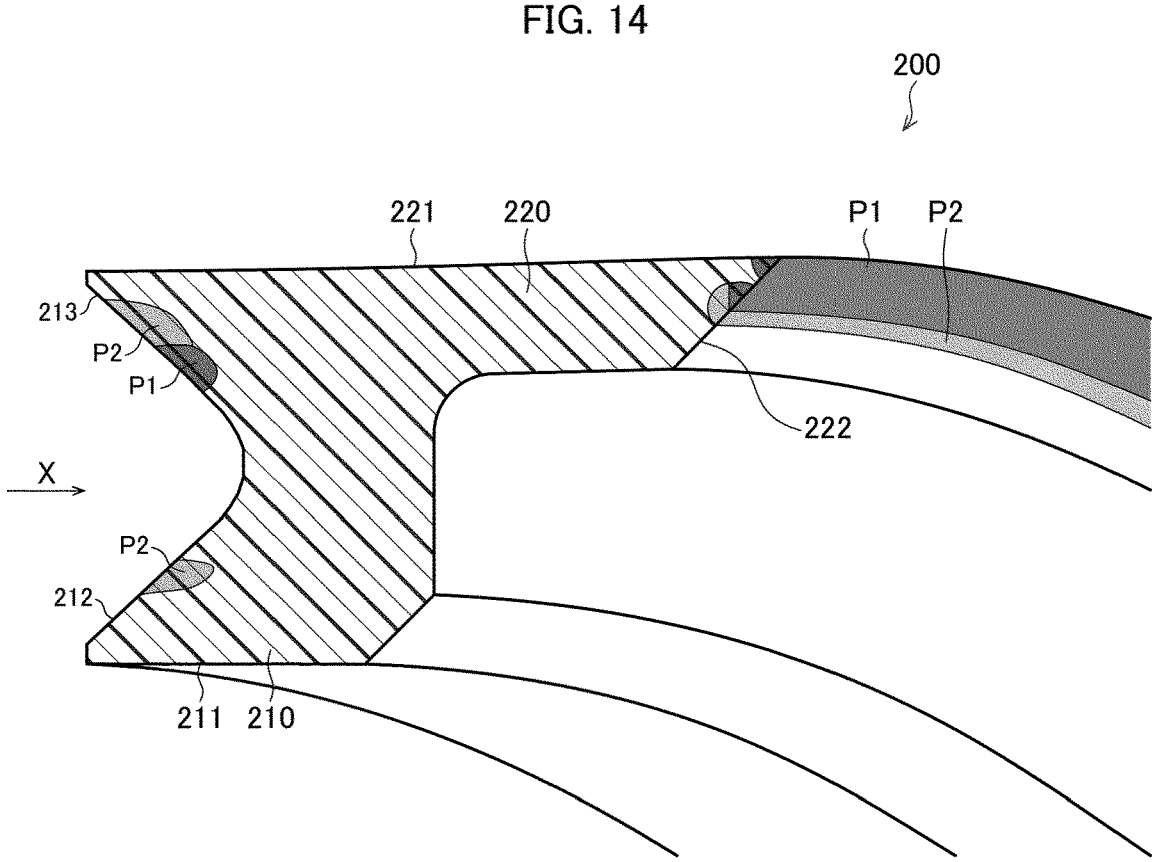
FIG. 14 is a second drawing illustrating the strength and the distribution of the pressing force exerted by the reference sealing member during the sealing.
Figure 15:
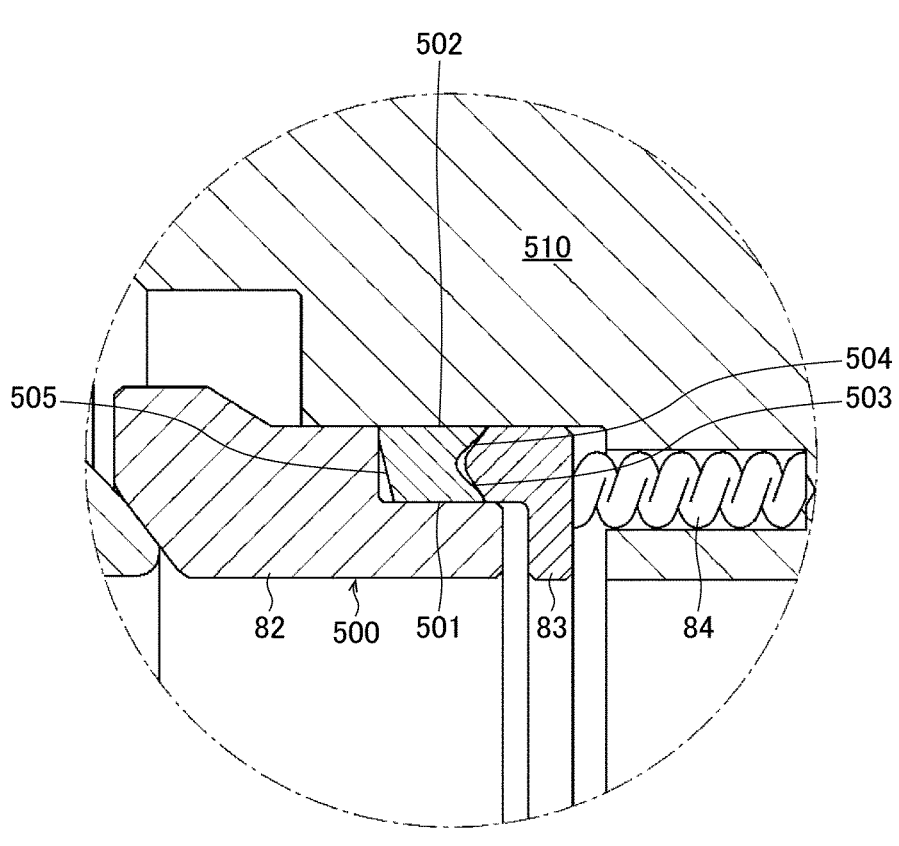
FIG. 15 illustrates a cross section of a main part of an example conventional valve.

FIG. 13 illustrates strength of a surface pressure that occurs in the sealing member 200 and a vicinity thereof in a case where the sealing member 200 of the reference example is pressed in the X direction. FIG. 14 illustrates the strength of the surface pressure that occurs in the sealing member 200 in a case where the sealing member 200 of the reference example is pressed in the X direction. Also in each of FIGS. 13 and 14, P1 denotes a part in which a strong surface pressure occurs, and P2 denotes a part in which a surface pressure that is strong second to P1 occurs.

As is clear from FIGS. 13 and 14, in the sealing member of the reference example, by pressing by the pressing surface 831a of a retainer gland, a strong surface pressure occurs only in the upper tapered surface 213 and only a weak surface pressure occurs in the lower tapered surface 212, in a V-shaped groove part located at a first end of the sealing member 200 (the tapered surfaces 212 and 213 on a first end side of the first pressing part 210). From this result, it is confirmed that the sealing member 200 of the reference example is likely to have an insufficient surface pressure particularly with respect to an outer circumferential wall surface of a ball seat.

[Comparison in Sealing Properties]

(1) Experiment at Low Temperature

An element test was carried out to check sealing properties of a sealing member in a valve as illustrated in FIG. 3. Specifically, first, a jig (body jig) that reproduces a shape of (i) a part of a body of a valve to which part the sealing member was to be attached and (ii) a vicinity of the part was prepared, and then a testing device was prepared. The testing device was prepared as follows: after the sealing member was attached to the body jig, a retainer gland was disposed such that the sealing member was sandwiched between the retainer gland and the body jig, and then the retainer gland was installed such that a ball seat was pressed with a pressing force comparable to that of a spring used for a valve. As the sealing member, a sealing member made of UMW-PE, as illustrated in FIGS. 1 and 2, was prepared. This sealing member is denoted by S1. Further, a sealing member made of UMW-PE, as illustrated in FIGS. 12 to 14, was prepared. This sealing member is denoted by SC1.

Then, the sealing properties were checked under a low-temperature (−196° C.) condition. With use of helium gas as a fluid, a given pressure (ΔP) was applied to the sealing member from a body jig side of the test device. Then, an amount (unit: 20 mL/min) of the helium gas that leaked to a retainer gland side of the test device was measured. In this manner, a leakage amount at the sealing member was measured. In Table 1, "1" and "2" each represent an experimental example number.

TABLE 1

| | | S1 Leakage amount (mL/min) | | SC1 Leakage amount (mL/min) | |
|---|---|---|---|---|---|
| Sealing member No. | | 1 | 2 | 1 | 2 |
| Pressure | 0.1 | 0.0 | 0.0 | 5.3 | 10.0 |
| ΔP (MPa) | 0.6 | 0.0 | 0.0 | 100.0 | 150.3 |
| | 1.0 | 0.0 | 0.0 | 425.0 | 460.0 |
| | 2.0 | 0.0 | 0.0 | >500 | >500 |
| | 3.0 | 5.0 | 1.5 | >500 | >500 |
| | 4.0 | 9.0 | 3.0 | >500 | >500 |
| | 4.5 | 16.0 | 6.0 | >500 | >500 |

As is clear from Table 1, according to the sealing member S1 corresponding to an embodiment of the present invention, the amount of the helium gas that leaked at a low temperature was approximately 0 mL/min to 16.0 mL/min.

In contrast, according to the sealing member SC1 for reference, the amount of the helium gas that leaked increased as a pressure of the helium gas increased, as compared to the sealing member C1. This is considered to be because, in the sealing member SC1, since the sealing member SC1 is pressed in a V-shape, a surface pressure of the sealing member SC1 to an inner diameter side is smaller than that of the sealing member S1.

Modifications

The present invention is not limited to the above-described embodiments, but can be altered within the scope of the claims. The present invention also encompasses, in its technical scope, any embodiment derived by combining, as appropriate, technical means disclosed in differing embodiments.

For example, the planar shape of the sealing member can be determined as appropriate, depending on a planar shape of a gap that should be sealed. The planar shape of the sealing member may be the same as the planar shape of the gap, or may be a part of the planar shape of the gap. The planar shape of the sealing member is not limited to an annular shape, and may be a polygonal shape or may be a linear shape.

In the present invention, the first pressing part 110 may be configured to be disposed on an outer circumference side of the gap 90 and to press the inner circumferential wall surface of the stem housing section 6. Further, the second pressing part may be configured to be disposed on an inner circumference side of the gap 90 and to press the outer circumferential wall surface of the small-diameter part 822.

In the present invention, the second pressing part 120 may have a configuration that deforms the sealing member 100 toward the inner circumferential wall surface of the stem housing section 6, instead of the second tapered surface 122. For example, the second pressing part 120 may have a planar part that comes into contact with a protrusion disposed on an inner circumferential wall surface side of the step part 823. Similarly, in a case where the pressing surface of the retainer gland has a protrusion on an outer circumferential wall surface side of the small-diameter part 822, the first tapered surface 112 may also be a planar part.

In the present invention, the sealing member 100 may have a protrusion that exhibits a similar effect, instead of the taper of the first side surface 111 with respect to the imaginary straight line and the taper of the second side surface 121 with respect to the imaginary straight line. Further, depending on a structure of the gap 90, the sealing member 100 may not have the taper on the first side surface 111 and the taper on the taper of the second side surface 121. For example, in a case where the inner circumferential wall surface of the stem housing section 6 is a tapered surface that is configured such that the width of the gap 90 gradually reduces toward the step part 823, the sealing member 100 may not have the taper of the second side surface 121 with respect to the imaginary straight line.

The sealing member in accordance with the present invention is not limited to the above-described embodiments, and can be modified as appropriate within the spirit of the present invention. For example, in the sealing member 100, the connection part 130 that is constricted is present between the first pressing part 110 and the second pressing part 120. However, this connection part does not necessarily have a constricted shape. The sealing member may have a cross section having a rhombic shape as a whole.

Further, each of the cutout end parts of the sealing member 100 in accordance with the above-described embodiment may not have a straight cross-sectional shape. For example, a cross-sectional shape of each of the cutout end parts may include a curved line that is continuous with respect to one or both of the tapered surface and the side surface of the first pressing part or the second pressing part.

The sealing member in accordance with the present invention is applicable to any valve, provided that the any valve has a gap in which the sealing member can be disposed, which has a bottom, and which has a planar endless shape.

Further, the sealing member in accordance with the present invention is applicable not only to an ultra-low-temperature environment but also to a high-temperature environment by employing a material having appropriate physical properties.

Specifically, while the sealing member is pressed in a constant direction, the sealing member is capable of simultaneously exhibiting the sealing properties also with respect to both sides of the direction in which the sealing member is pressed. That is, the sealing member is capable of exhibiting excellent sealing properties in applications in which sealing properties in three directions are required. As such applications, the sealing member is also applicable to, for example, body sealing (sealing between the trunnion plate 61 and the stem 3 and sealing between the trunnion plate 61 and an inner circumference of the body 1) in the valve illustrated in FIGS. 3 and 4.

Note that, in an embodiment of the present invention, the sealing properties of the sealing member may be set as appropriate, depending on use conditions of the sealing member or performance required for the sealing member. Therefore, it is possible to determine the configuration of the sealing member in accordance with an embodiment of the present invention, provided that the sealing member satisfies various conditions, such as the use conditions of the sealing member and the performance required for the sealing member. Thus, depending on such conditions, the sealing member in accordance with an embodiment of the present invention may not have the beveled parts which differ in dimensions as described above. Further, the position at which the pressing surface of the retainer gland and the first tapered surface of the sealing member first come into contact with each other may not be the above-described position Pc. Moreover, there may be no difference between the taper angle of the pressing surface and the taper angle of the first tapered surface.

Aspects of the present invention can also be expressed as follows:

As is clear from the above description, a sealing member (100) in accordance with an embodiment of the present invention is a sealing member which seals a gap (90), of which a first end is an opening and a second end is a contact part (823a) and in which a direction from the first end to the second end is a depth direction, by coming into close contact with both side parts and the contact part of the gap in a case where the sealing member is disposed in the gap and pressed in the depth direction from a first end side, the sealing member including: a first pressing part (110) that is disposed on a first end side of the sealing member and that presses a first side part of the gap in a case where the sealing member is pressed in the depth direction of the gap in a state of sealing with the sealing member; a second pressing part (120) that is disposed on a second end side of the sealing member and that comes into close contact with the contact part and presses a second side part of the gap by pressing with respect to the first pressing part in the state of sealing with the sealing member; and a deformation inducing part (second tapered surface 122) that strains the sealing member in a direction in which the second pressing part is directed to the second side part of the gap, by the pressing with respect to the first pressing part in the state of sealing with the sealing member.

A sealing mechanism in accordance with an embodiment of the present invention is a sealing mechanism which is configured such that the above sealing member is disposed in the gap so as to seal the gap by coming into close contact with the both side parts and the contact part of the gap in a case where the sealing member is pressed in the depth direction from the first end side, wherein: the first pressing part is apart from the second side part of the gap, and the second pressing part is apart from the first side part of the gap; and the sealing member seals the gap in a state where the second pressing part is strained toward the second side part of the gap, by being pressed in the depth direction from the first end side so that the first pressing part moves to the second end side and the second pressing part comes into contact with the contact part.

A valve in accordance with an embodiment of the present invention is a valve including the above sealing member which is provided in the gap that is surrounded by a seat member (ball seat 82), a body (1), and a retainer gland (83) which is in contact with the first pressing part, the sealing member sealing the gap by being pressed toward the seat member by the retainer gland.

A sealing method in accordance with an embodiment of the present invention is a sealing method for sealing the gap between the seat member and the body of the valve (10) by disposing the above sealing member in the gap and pressing the first pressing part of the sealing member toward the seat member with use of the retainer gland.

With the above configuration, it is possible for an embodiment of the present invention to exhibit excellent sealing properties by the sealing member even at a low temperature and a high pressure.

In an embodiment of the present invention, the sealing member may be configured such that: the first pressing part is a part close to a first end of the sealing member and a first side of the sealing member; the first pressing part includes a first side surface (111) that is in contact with the first side part of the gap in the state of sealing with the sealing member, and a first tapered surface (112) that is exposed at a first end side of the first pressing part and that is configured such that, in a cross-sectional shape of the sealing member, a distance from the first side surface to the first tapered surface gradually reduces toward the first end of the sealing member; the second pressing part is a part close to a second end of the sealing member and a second side of the sealing member; the second pressing part includes a second side surface (121) that is in contact with the second side part of the gap in the state of sealing with the sealing member, and a second tapered surface (122) that is exposed at a second end side of the second pressing part and that is configured such that, in the cross-sectional shape of the sealing member, a distance from the second side surface to the second tapered surface gradually reduces toward the second end of the sealing member; an inclination angle of the second tapered surface with respect to the second side surface in a state of not sealing with the sealing member is smaller than the inclination angle in the state of sealing with the sealing member; and the deformation inducing part is a part including the second tapered surface. This configuration is more effective from the viewpoint of pressing the both side parts of the gap with sufficient strength by pressing in the depth direction of the gap.

In an embodiment of the present invention, the sealing member may be configured such that: the first pressing part includes a first cutout end part (113) that is formed by connecting a first end edge of the first tapered surface and a first end edge of the first side surface in the cross-sectional shape of the sealing member; the second pressing part includes a second cutout end part (123) that is formed by connecting a second end edge of the second tapered surface and a second end edge of the second side surface in the cross-sectional shape of the sealing member; the first side surface is a tapered surface that is configured such that, in the cross-sectional shape of the sealing member, a distance between the tapered surface and a second imaginary straight line which connects a first end edge of the second side surface and the second end edge of the second tapered surface gradually reduces toward a second end edge of the first side surface; and the second side surface is a tapered surface that is configured such that, in the cross-sectional shape of the sealing member, a distance between the tapered surface and a first imaginary straight line which connects the second end edge of the first side surface and the first end edge of the first tapered surface gradually reduces toward the first end edge of the second side surface. This configuration is more effective from the viewpoint of increasing a pressing force to the side parts of the gap and from the viewpoint of more widely distributing pressed parts of the side parts to the depth direction of the gap.

In an embodiment of the present invention, the sealing member may be configured such that: the first pressing part further includes a first beveled part (114) at a second end edge of the first side surface; the second pressing part further includes a second beveled part (124) at a first end edge of the second side surface; and the first beveled part is larger than the second beveled part. This configuration is more effective from the viewpoint of enhancing the sealing properties of the sealing member.

That the sealing member in accordance with an embodiment of the present invention is made of a resin is more effective from the viewpoint of enhancing the sealing properties of the sealing member, and is suitable for application to an ultra-low-temperature environment in which the sealing member is unlikely to be deformed.

The sealing member in accordance with an embodiment of the present invention may be configured such that the sealing member has an endless shape as viewed along a direction of insertion into the gap, and is disposed in the gap, which is formed between the seat member and the body in the valve, and pressed toward the seat member by the retainer gland. The sealing member is more effective from the viewpoint of applying a valve element in the valve to the seat.

In an embodiment of the present invention, that the valve element of the valve is a ball (4) is more effective in an application of sealing of the valve element.

In an embodiment of the present invention, the valve may be a valve for opening and closing a pipe through which liquid hydrogen flows. It is possible for the sealing member in accordance with an embodiment of the present invention to, even in an ultra-low-temperature environment comparable to the liquid hydrogen, exhibit the sealing properties that are excellent enough to prevent leakage of the liquid hydrogen from the gap.

In an embodiment of the present invention, the first pressing part may be configured to be most strongly pressed at a position in the first tapered surface which position is located between a position of ¼ and a position of ⅛ close to the first side of the gap in a width direction of the gap into which the sealing member is inserted. This configuration is more effective from the viewpoint of enhancing the sealing properties of the sealing member.

In an embodiment of the present invention, the valve may be configured such that: the retainer gland includes a pressing part (831) that presses the sealing member; the pressing part includes a first side edge that is located at the position between the position of ¼ and the position of ⅛ close to the first side of the gap in the width direction of the gap and a tapered pressing surface (831*a*) that is configured such that a distance from a first side surface of the gap to the tapered pressing surface gradually increases toward a second end side of the gap; and an angle formed by the tapered pressing surface with respect to the first side surface of the gap is larger than an angle formed by the first tapered surface with respect to the first side surface of the first pressing part. This configuration is more effective from the viewpoint of enhancing the sealing properties of the sealing member.

REFERENCE SIGNS LIST

1, 510 Body
2 Bonnet
2*a* Through-opening part
3 Stem
4 Ball
4*a*, 61*a* Through hole
4*b* Protrusion
4*b*' Protruding end
5 Valve element housing section
6 Stem housing section
6*a* Communication port
6*b* Upper end opening
6*c* Intermediate part
6*d* Flange part
7 Piping structure section
9 Operation section
10 Valve
21 Purge valve
22 Gland plate
23 Gland packing
31 Connection part
51 Central region
51*a* Recess
52 End region
61 Trunnion plate

26

62 Yoke plate
62*b* Outer circumferential surface
80 Sealing mechanism
82 Ball seat
83 Retainer gland
84 Spring
90 Gap
99 Handle
100, 200 Sealing member
110, 210 First pressing part
111, 211 First side surface
112 First tapered surface
113 First cutout end part
114 First beveled part
120, 220 Second pressing part
121, 221 Second side surface
122, 222 Second tapered surface
123 Second cutout end part
124 Second beveled part
130 Connection part
212, 213 Tapered surface
500 Packing
501 Inner circumferential wall surface
502 Outer circumferential wall surface
503 First tapered surface
504 First reverse tapered surface
505 Second tapered surface
821 Large-diameter part
822 Small-diameter part
823 Step part
823*a* Contact part
831 Pressing part
831*a* Pressing surface
832 Spring housing part
L1 First imaginary straight line
L2 Second imaginary straight line

The invention claimed is:

1. A sealing member which seals a gap, of which a first end is an opening and a second end is a contact part and in which a direction from the first end to the second end is a depth direction, by coming into close contact with both side parts and the contact part of the gap in a case where the sealing member is disposed in the gap and pressed in the depth direction from a first end side, the sealing member comprising:

a first pressing part that is disposed on a first end side of the sealing member and that presses a first side part of the gap in a case where the sealing member is pressed in the depth direction of the gap in a state of sealing with the sealing member;

a second pressing part that is disposed on a second end side of the sealing member and that comes into close contact with the contact part and presses a second side part of the gap by pressing with respect to the first pressing part in the state of sealing with the sealing member;

a connection part that is a part in which a second end part of the first pressing part and a first end part of the second pressing part are overlapped and joined, and that makes the cross-sectional shape constricted in a central part of the sealing member; and a deformation inducing part that strains the sealing member in a direction in which the second pressing part is directed to the second side part of the gap, by the pressing with respect to the first pressing part in the state of sealing with the sealing member.

2. The sealing member as set forth in claim 1, wherein:

the first pressing part is a part close to a first end of the sealing member and a first side of the sealing member;

the first pressing part includes a first side surface that is in contact with the first side part of the gap in the state of sealing with the sealing member, and a first tapered surface that is exposed at a first end side of the first pressing part and that is configured such that, in a cross-sectional shape of the sealing member, a distance from the first side surface to the first tapered surface gradually reduces toward the first end of the sealing member;

the second pressing part is a part close to a second end of the sealing member and a second side of the sealing member;

the second pressing part includes a second side surface that is in contact with the second side part of the gap in the state of sealing with the sealing member, and a second tapered surface that is exposed at a second end side of the second pressing part and that is configured such that, in the cross-sectional shape of the sealing member, a distance from the second side surface to the second tapered surface gradually reduces toward the second end of the sealing member;

an inclination angle of the second tapered surface with respect to the second side surface in a state of not sealing with the sealing member is smaller than the inclination angle in the state of sealing with the sealing member; and the deformation inducing part is a part including the second tapered surface.

3. The sealing member as set forth in claim 2, wherein:

the first pressing part includes a first cutout end part that is formed by connecting a first end edge of the first tapered surface and a first end edge of the first side surface in the cross-sectional shape of the sealing member;

the second pressing part includes a second cutout end part that is formed by connecting a second end edge of the second tapered surface and a second end edge of the second side surface in the cross-sectional shape of the sealing member;

the first side surface is a tapered surface that is configured such that, in the cross-sectional shape of the sealing member, a distance between the tapered surface and a second imaginary straight line which connects a first end edge of the second side surface and the second end edge of the second tapered surface gradually reduces toward a second end edge of the first side surface; and the second side surface is a tapered surface that is configured such that, in the cross-sectional shape of the sealing member, a distance between the tapered surface and a first imaginary straight line which connects the second end edge of the first side surface and the first end edge of the first tapered surface gradually reduces toward the first end edge of the second side surface.

4. The sealing member as set forth in claim 2, wherein:

the first pressing part further includes a first beveled part at a second end edge of the first side surface;

the second pressing part further includes a second beveled part at a first end edge of the second side surface; and the first beveled part is larger than the second beveled part.

5. The sealing member as set forth in claim 1, wherein the sealing member is made of a resin.

6. The sealing member as set forth in claim 1, wherein the sealing member has an endless shape as viewed along the depth direction of the gap, and is disposed in the gap, which is formed between a seat member and a body in a valve, and pressed toward the seat member by a retainer gland that is in contact with the first pressing part.

7. The sealing member as set forth in claim 6, wherein a valve element of the valve is a ball.

8. A valve comprising:

a body;

a seat member;

a retainer gland; and the sealing member recited in claim 1.

9. The valve as set forth in claim 8, wherein:

the first pressing part is a part close to a first end of the sealing member and a first side of the sealing member;

the first pressing part includes a first side surface that is in contact with a first side part of the gap in a state of sealing with the sealing member, and a first tapered surface that is exposed at a first end side of the first pressing part and that is configured such that, in a cross-sectional shape of the sealing member, a distance from the first side surface to the first tapered surface gradually reduces toward the first end of the sealing member;

the second pressing part is a part close to a second end of the sealing member and a second side of the sealing member;

the second pressing part includes a second side surface that is in contact with a second side part of the gap in the state of sealing with the sealing member, and a second tapered surface that is exposed at a second end side of the second pressing part and that is configured such that, in the cross-sectional shape of the sealing member, a distance from the second side surface to the second tapered surface gradually reduces toward the second end of the sealing member; and the first pressing part is most strongly pressed, by the retainer gland, at a position between a position of ¼ and a position of ⅛ close to a first side of the gap in a width direction of the gap.

10. The valve as set forth in claim 9, wherein:

the retainer gland includes a pressing part that presses the sealing member;

the pressing part includes a first side edge that is located at the position between the position of ¼ and the position of ⅛ close to the first side of the gap in the width direction of the gap and a tapered pressing surface that is configured such that a distance from a first side surface of the gap to the tapered pressing surface gradually increases toward a second end side of the gap; and an angle formed by the tapered pressing surface with respect to the first side surface of the gap is larger than an angle formed by the first tapered surface with respect to the first side surface of the first pressing part.

11. A sealing method for sealing a gap between a seat member and a body of a valve by disposing the sealing member recited in claim 1 in the gap and pressing the first pressing part of the sealing member toward the seat member with use of a retainer gland.

12. The sealing method as set forth in claim 11, wherein the valve is for opening and closing a pipe through which liquid hydrogen flows.

13. A sealing mechanism which is configured such that a sealing member is disposed in a gap, of which a first end is an opening and a second end is a contact part and in which a direction from the first end to the second end is a depth direction, so as to seal the gap by coming into close contact with both side parts and the contact part of the gap in a case where the sealing member is pressed in the depth direction from a first end side, wherein:

the sealing member includes a first pressing part that is disposed on a first end side of the sealing member and that presses a first side part of the gap in a case where the sealing member is pressed in the depth direction of the gap in a state of sealing with the sealing member, a second pressing part that is disposed on a second end side of the sealing member and that comes into close contact with the contact part and presses a second side part of the gap by pressing with respect to the first pressing part in the state of sealing with the sealing member, a connection part that is a part in which a second end part of the first pressing part and a first end part of the second pressing part are overlapped and joined, and that makes the cross-sectional shape constricted in a central part of the sealing member, and a deformation inducing part that strains the sealing member in a direction in which the second pressing part is directed to the second side part of the gap, by the pressing with respect to the first pressing part in the state of sealing with the sealing member;

the first pressing part is apart from the second side part of the gap, and the second pressing part is apart from the first side part of the gap; and the sealing member seals the gap in a state where the second pressing part is strained toward the second side part of the gap, by being pressed in the depth direction from the first end side so that the first pressing part moves to the second end side and the second pressing part comes into contact with the contact part.

14. The sealing mechanism as set forth in claim 13, wherein:

the first pressing part is a part close to a first end of the sealing member and a first side of the sealing member;

the first pressing part includes a first side surface that is in contact with the first side part of the gap in the state of sealing with the sealing member, and a first tapered surface that is exposed at a first end side of the first pressing part and that is configured such that, in a cross-sectional shape of the sealing member, a distance from the first side surface to the first tapered surface gradually reduces toward the first end of the sealing member;

the second pressing part is a part close to a second end of the sealing member and a second side of the sealing member;

the second pressing part includes a second side surface that is in contact with the second side part of the gap in the state of sealing with the sealing member, and a second tapered surface that is exposed at a second end side of the second pressing part and that is configured such that, in the cross-sectional shape of the sealing member, a distance from the second side surface to the second tapered surface gradually reduces toward the second end of the sealing member; and in a case where a distance between a first side and a second side of the gap is regarded as a width of the gap, the first pressing part is most strongly pressed at a position in the first tapered surface which position is located between a position of ¼ and a position of ⅛ close to the first side of the gap in a width direction of the gap.

* * * * *